US010255585B2

(12) United States Patent
Mondal et al.

(10) Patent No.: US 10,255,585 B2
(45) Date of Patent: Apr. 9, 2019

(54) SYSTEM AND METHOD FOR DETERMINING CANDIDATES FOR A ROLE IN AN ORGANIZATION

(71) Applicant: O5 Systems, Inc., Toronto (CA)

(72) Inventors: Somen Mondal, Toronto (CA); Shaun Christopher Ricci, Toronto (CA); Ji-A Min, Toronto (CA); Matthew Sergeant, Toronto (CA)

(73) Assignee: O5 SYSTEMS, INC. (CA)

( * ) Notice: Subject to any disclaimer, the term of this patent is extended or adjusted under 35 U.S.C. 154(b) by 840 days.

(21) Appl. No.: 14/103,244

(22) Filed: Dec. 11, 2013

(65) Prior Publication Data
US 2015/0161567 A1 Jun. 11, 2015

(51) Int. Cl.
G06Q 10/00 (2012.01)
G06Q 10/10 (2012.01)
(52) U.S. Cl.
CPC ......... *G06Q 10/1053* (2013.01); *G06Q 10/00* (2013.01); *G06Q 10/105* (2013.01)
(58) Field of Classification Search
USPC ................................................ 705/320, 321
See application file for complete search history.

(56) References Cited

U.S. PATENT DOCUMENTS

| | | | | |
|---|---|---|---|---|
| 6,192,103 B1* | 2/2001 | Wormington | ........ | G01N 23/207 378/73 |
| 2002/0026342 A1* | 2/2002 | Lane | ...................... | G06Q 10/04 705/7.22 |
| 2004/0054553 A1* | 3/2004 | Zizzamia | ............. | G06Q 10/063 705/4 |
| 2009/0006178 A1* | 1/2009 | Taylor | ............ | G06Q 10/063118 705/7.32 |
| 2010/0153289 A1* | 6/2010 | Schneiderman | ..... | G06Q 10/105 705/320 |
| 2014/0122355 A1* | 5/2014 | Hardtke | ............... | G06Q 10/105 705/321 |

OTHER PUBLICATIONS

J. Wright, A. Alajrni/International Journal of Sustainable Built Environment 5 (2016) 123-131; Efficient Genetic Algorithm sets for optimizing constrained building design problem.*
J. McCall / Journal of Computational and Applied Mathematics 184 (2005) 205-222; Genetic algorithms for modelling and optimization.*

* cited by examiner

*Primary Examiner* — Gabrielle A McCormick
(74) *Attorney, Agent, or Firm* — Tarolli, Sundheim, Covell & Tummino LLP

(57) ABSTRACT

A system, method and computer program product for determining suitability of a candidate for a role in an organization. According to an embodiment, the system is configured to generate an ideal candidate profile for the selected role based on performance data, psychometric test results and/or social network or profile data of one or more employees or individuals in an organization. The system is configured to generate a profile for the candidate in the selected role based on psychometric test results and/or social network data. The system compares the profile of the candidate to the ideal candidate profile and the basis of the comparison generates a suitability rating or factor for the candidate in the selected role.

15 Claims, 24 Drawing Sheets

INSTRUCTIONS

THE FOLLOWING STATEMENTS DESCRIBE DIFFERENT WAYS A PERSON MAY FEEL, THINK, OR BEHAVE. FOR EACH STATEMENT, PLEASE RATE HOW ACCURATELY IT DESCRIBES YOU IN A WORK CONTEXT. RATE YOURSELF AS YOU HONESTLY SEE YOURSELF, IN RELATION TO OTHER PEOPLE YOU KNOW OF THE SAME SEX AND ROUGHLY YOUR SAME AGE. REMEMBER, THERE ARE NO RIGHT OR WRONG ANSWERS.

| EMPLOYER 741 | INDUSTRY | 742 EMPLOYMENT HISTORY 744 POSITION | STARTED ON | 746 | ENDED ON | 748 |
|---|---|---|---|---|---|---|
| EMAILTDN.COM | COMMPUTER & NETWORK | FOUNDER | APR | 2003 | | X |
| HUBDOC | INTERNET | VICE PRESIDENT OF DEV | JAN | 2011 | | X |
| APACHE SOFTWARE FOU | COMPUTER SOFTWARE | PROJECT MANAGER | JAN | 2011 | | X |
| CPAN | COMPUTER SOFTWARE | MODULE AUTHOR | JAN | 1998 | | X |
| OPEN SOURCE PROJECT | COMPUTER & NETWORK | GURU | JAN | 1992 | | X |
| SYMANTEC | COMPUTER SOFTWARE | SENIOR ANTI-SPAM TEC | | 2009 | JAN 2012 | X |
| MESSAGELABS | INFORMATION TECHNOLO | SENIOR ANTI-SPAM TEC | | 2001 | JAN 2012 | X |
| SYMANTEC HOSTED SER | COMPUTER & NETWORK | SENIOR PRINCIPAL SOFTW | | 2001 | JAN 2012 | X |
| O'REILLY AND ASSOCIATE | PUBLISHING | CONTRACTOR | AUG | 2000 | MAR 2001 | X |
| BBC | COMPUTER & NETWORK | WEB DEVELOPER | AUG | 1999 | MAR 2000 | X |

FIG. 7E

SYSTEM AND METHOD FOR DETERMINING CANDIDATES FOR A ROLE IN AN ORGANIZATION

FIELD OF THE INVENTION

The present invention relates to computer systems and more particularly, to a system and method for determining or evaluating candidates suitable for an employment position or a role in an organization or company.

BACKGROUND OF THE INVENTION

In the art, psychometric testing has been found to be an effective way to discover if a candidate is worth interviewing or hiring for a position.

However, it has also been found that psychometric testing includes one or more of the following flaws or shortcomings. The test results are presented in document form and therefore require manual examination. Comparison to current employees is another manual process. The psychometric test results do not provide correlation to actual performance of current employees. Furthermore, psychometric test scores are based on academic research or factors that are not necessarily tailored to an organization or a role within an organization.

Accordingly, there remains a need for improvements in the art.

BRIEF SUMMARY OF THE INVENTION

The present invention is directed to embodiments of a method and system for selecting or determining candidates suitable for an employment position or in a role with an organization, company or enterprise.

In accordance with an embodiment, the present invention comprises a system for determining suitability of a candidate for a selected role in an organization, the system comprises: a processor operatively coupled to a database and including an input component configured to retrieve performance data associated with an ideal candidate; the processor including a component configured to generate an ideal candidate profile based on the performance data associated with the ideal candidate; the processor including an input component configured to input data associated with the candidate; the processor including a component configured to generate a profile for the candidate based on said inputted data; and the processor including a comparison component configured to compare the profile to the ideal candidate profile, and a component configured to generate a suitability rating for the selected role based on the comparison.

In accordance with another embodiment, the present invention comprises computer-implemented method for determining a suitability rating for a candidate for a selected role in an organization, the method comprises: inputting data from a database associated with an ideal candidate for the selected role; generating an ideal candidate profile for the selected role based on the inputted data; collecting data associated with the candidate; generating a profile for the candidate based on the collected data; comparing the profile of the candidate to the ideal candidate profile; and generating the suitability rating for the candidate for the selected role based on the comparison.

In accordance with yet another embodiment, the present invention comprises computer program product for determining a suitability rating for a candidate for a selected role in an organization, the computer program product comprises: a non-transitory storage medium configured to store computer readable instructions; the computer readable instructions including instructions for, inputting data from a database associated with an ideal candidate for the selected role; generating an ideal candidate profile for the selected role based on the inputted data; collecting data associated with the candidate; generating a profile for the candidate based on said collected data; comparing the profile of the candidate to the ideal candidate profile; and generating the suitability rating for the candidate for the selected role based on the comparison.

Other aspects and features of the present invention will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example, embodiments of the present invention, and in which:

FIGS. 6A to 6D are screenshots illustrating aspects of the operation of a psychometric test according to an embodiment of the present invention;

FIG. 7A to 7E are screenshots illustrating a process for entering or importing information concerning a candidate for a specified role in the organization or company.

Like reference numerals indicate like or corresponding elements or components in the drawings.

DETAILED DESCRIPTION OF THE EMBODIMENTS OF THE INVENTION

Figure 1:
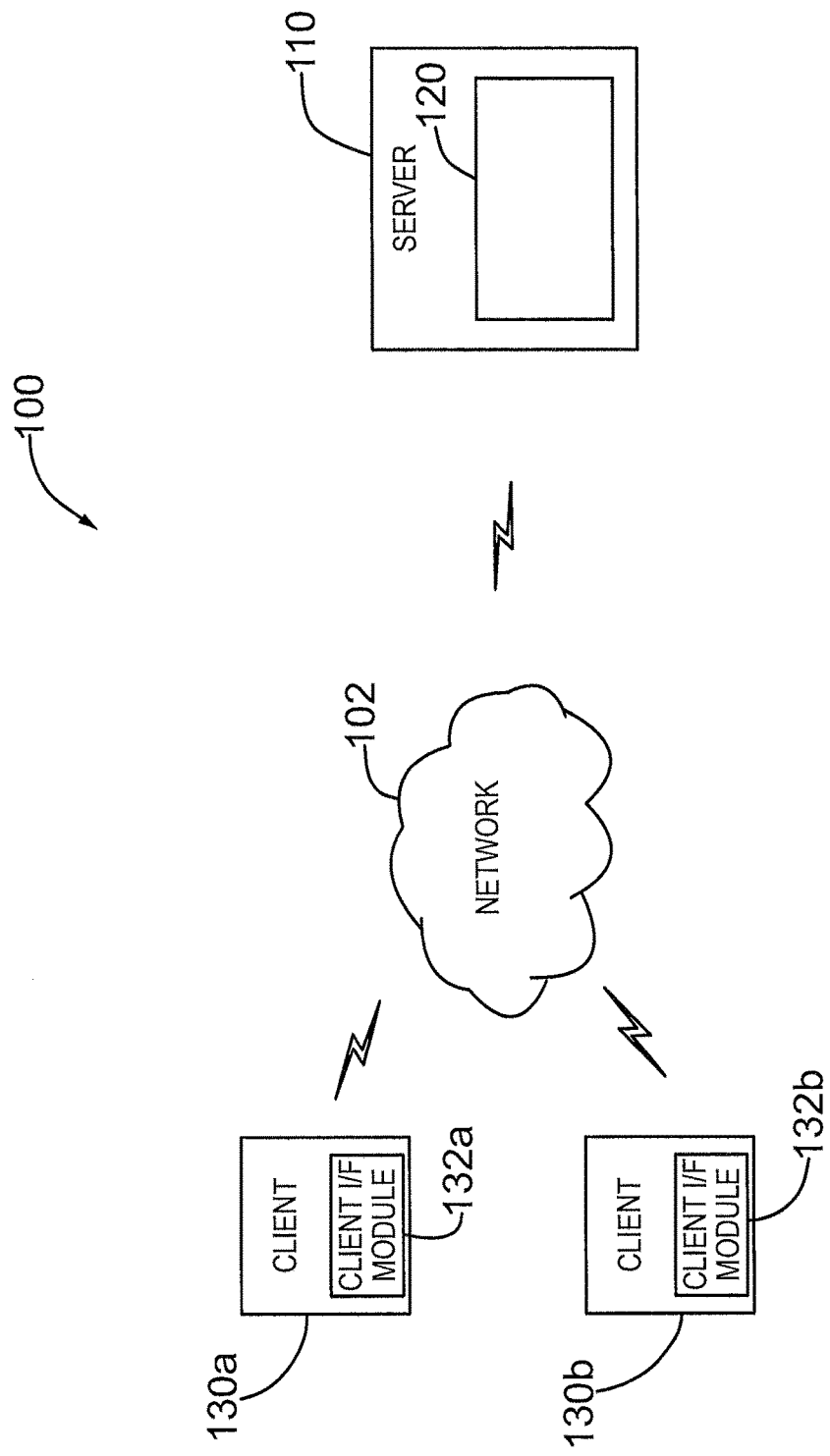
FIG. 1 shows in diagrammatic form an exemplary network based configuration suitable for implementing a system and a method according to embodiments of the present invention.

FIG. 1 shows an exemplary network based implementation for a system for selecting candidates according to an embodiment of the present invention, and indicated generally by reference 100. The system 100 comprises a server (or more one than server) indicated generally by reference 110 coupled to one or more client machines or appliances 130, indicated individually by references 130a and 130b in FIG. 1, operatively coupled through a network indicated generally by reference 102.

The client machine or appliance 130 may include a device, such as a personal computer, a wireless communication device or telephone, a personal digital assistant (PDA), a tablet, a lap top computer, or another type of computation or communication device, a thread or process running on one of those devices, and/or an object executable by the one of these devices. The server 110 may include a server application or module 120 configured to gather, process, search, and/or maintain a graphical user interface and functionality (e.g. web pages) in a manner consistent with the embodiments as described in more detail below.

The network 102 may include a local area network (LAN), a wide area network (WAN), a telecommunication network, such as the Public Switched Telephone Network (PSTN), an Intranet, the Internet, or a combination of networks. According to another aspect, the system 100 may be implemented as a cloud-based system or service utilizing the Internet 102.

Figure 2:
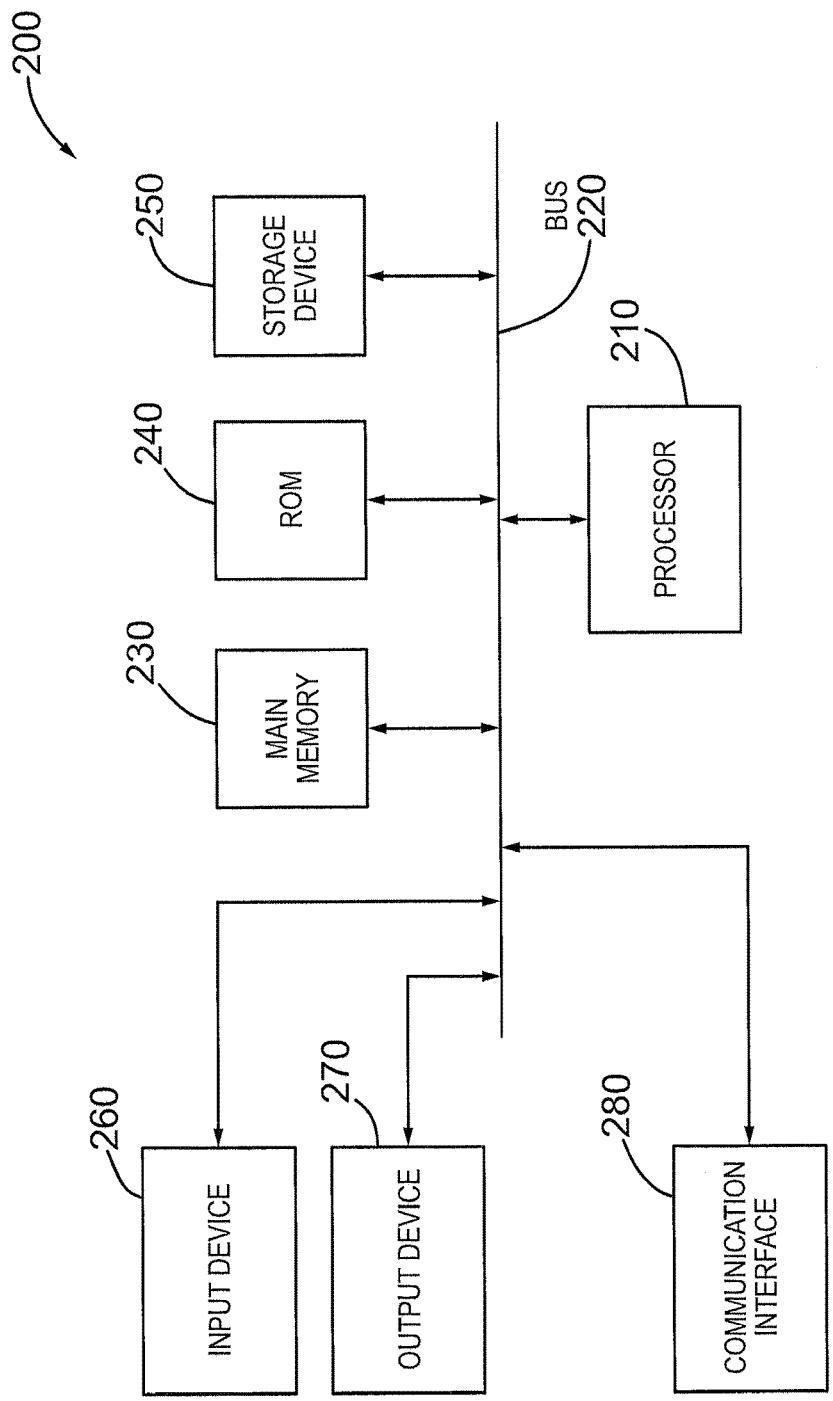
FIG. 2 shows in block diagram form an exemplary configuration for a client or server of FIG. 1 suitable for implementing a system and/or processes according to embodiments of the present invention.

Reference is next made to FIG. 2, which shows an exemplary implementation for a client or server entity (i.e. a "client/server entity"), which may correspond to one or more of the servers 110 and/or the client machines or appliances 130, in accordance with the functionality and features of the embodiments as described in more detail below. The client/server entity is indicated generally by reference 200 and comprises a processor 210, a bus 220, a main memory 230, read only memory or ROM 240, a mass storage device 250, an input device 260, an output device 270 and a communication interface 280. The bus 220 comprises a configuration (e.g. communication paths or channels) that permits communication among the elements or components comprising the client/server entity 200.

The processor 210 may comprise a processor, microprocessor, or processing logic that is configured to interpret and/or execute instructions. The main memory 230 may comprise a random access memory (RAM) or other types of dynamic storage device that is configured to store information and/or instructions for execution by the processor 210. The ROM 240 may comprise a conventional ROM device or another type of static or non-volatile storage device configured to store static information and/or instructions for use by the processor 210. The storage device 250 may comprise a disk drive or other mass storage device such as a magnetic and/or optical recording medium and its corresponding drive or controller.

The input device 260 may comprise a device or mechanism configured to permit an operator or user to input information to the client/server entity 200, such as, a keyboard, a mouse, a stylus, voice recognition and/or biometric mechanisms, etc. The output device 270 may comprise a device or mechanism that outputs information to the user or operator, including a display, a printer, a speaker, etc. The communication interface 280 may comprise a transceiver device or mechanism, or the like, configured to enable the client/server entity 200 to communicate with other devices and/or systems. For instance, the communication interface 280 may comprise mechanisms or devices for communicating with another machine, appliance or system via a network, for example, the network 102 (FIG. 1).

As will be described in more detail below, the client/server entity 200, in accordance with embodiments according to the present invention, may be configured to perform operations or functions relating to the process of selecting a suitable candidate. The client/server entity 200 may be configured to perform these operations and/or functions in response to the processor 210 executing software instructions or computer code contained in a computer-readable medium, such as the memory 230. The computer-readable medium may comprise a physical or a logical memory device or medium.

The software instructions or computer code may be read into the memory 230 from another computer-readable medium, such as a data storage device 250, or from another device or machine via the communication interface 280. The software instructions or computer code contained or stored in the memory 230 instruct or cause the processor 210 to perform or execute processes and/or functions as described in more detail below. In the alternative, hardwired circuitry, logic arrays, and the like, may be used in place of or in combination with software instructions to implement the processes and/or functions in accordance with the embodiments of the present invention. Therefore, implementations consistent with the principles of the embodiments according to the present invention are not limited to any specific combination of hardware and/or software.

Referring back to FIG. 1, each of the client machines 130 includes a client interface module 132 which is configured to provide an interface with the server 110. According to an embodiment, the client interface module 132 comprises a user interface or GUI (Graphical User Interface) which is configured to display and run one or more web pages that are downloaded from the server 110 (i.e. the application module 120 running on or being executed by the server 110) and may be implemented utilizing a web browser, such as the Internet Explorer™ browser or the Safari™ browser. According to an embodiment, the client interface module 132 and the web pages comprise logic and processes configured to provide a user with the functionality as described in more detail below. The particular implementation details will be readily within the understanding of one skilled in the art.

According to an embodiment, the present invention comprises a process configured to identify candidate(s) that are suitable for a role in an organization, e.g. likely to succeed in the organization. The process comprises the following steps as described below:

1. Assessment of an Organization's Existing Work Force

The system is configured to assess or measure the existing work force, e.g. employees working in sales positions, of an organization or company utilizing an online or network based system that applies a psychometric assessment in addition to collecting relevant data or information (i.e. social network or profile data) through one or more social networks, e.g. LinkedIn.

2. Performing a Statistical Analysis to Link the Psychometric Data and Social Network Data to Performance Data The system is configured to link the employees' psychometric data and social network data to their performance outcomes measured in a Customer Relationship Management (CRM), or a Human Resource Management (HRM) system, or more generally a Human Capital Management (HCM) system. According to an embodiment, the system is configured to perform statistical data analyses to determine the relationships between the psychometric data, social network data, and performance data.

3. Benchmark the Existing Work Force to Create an "Ideal Candidate" Profile

The system is configured to perform a benchmarking operation to benchmark the top performers (for example, defined as the top 20% in productivity in a sales role) by quantifying the characteristics identified by the system that best predict performance. According to this aspect, the system creates or generates an "Ideal Candidate" profile, wherein the ideal candidate profile is specific to a role, a company and/or an industry, or to a selected reference group.

4. Comparison of Job Candidate(s) to the "Ideal Candidate" Profile (or to a Specific Employee) to Make Hiring Recommendation The system is configured to assess or measure the candidate(s) by applying a psychometric assessment in addition to collecting relevant social network data (as described above). The system is configured to then compare the job candidate against an "Ideal Candidate" profile, or to a specific employee in the company, utilizing an empirically derived matching algorithm. According to an embodiment, the "Ideal Candidate" profile is based or derived from one or more existing employees (i.e. "ideal candidates") in an organization or company, or in a selected role or function with an organization or company, utilizing performance data, test results (e.g. psychometric tests) and/or social network data and/or other information or data, as described in more detail below. According to another embodiment, the "Ideal Candidate" profile is based on a "theoretical" employee or individual (e.g. the "ideal candidate"). The theoretical employee comprises an individual having characteristics, attributes, traits, experience, and/or meet criteria that are desirable or needed for a role or function in an organization or company, or at an executive or other management level or at a company or organization level. Depending on how well the job candidate matches the "Ideal Candidate" profile or the specific employee, the system may be further configured to generate a recommendation based on the data on whether the candidate, or which candidate, will be likely to perform successfully in the organization and thus, whom to hire.

5. Track Hires to Make Data-driven Improvements to the Model for Greater Accuracy in the Prediction of Performance According to another aspect or embodiment, the system may be configured to track the performance of the hired candidate, for example, utilizing performance data from the CRM or FIRM model, and use this data to adjust the Ideal Candidate profile in order to increase the predictive accuracy of the hiring recommendations.

Figure 3A:
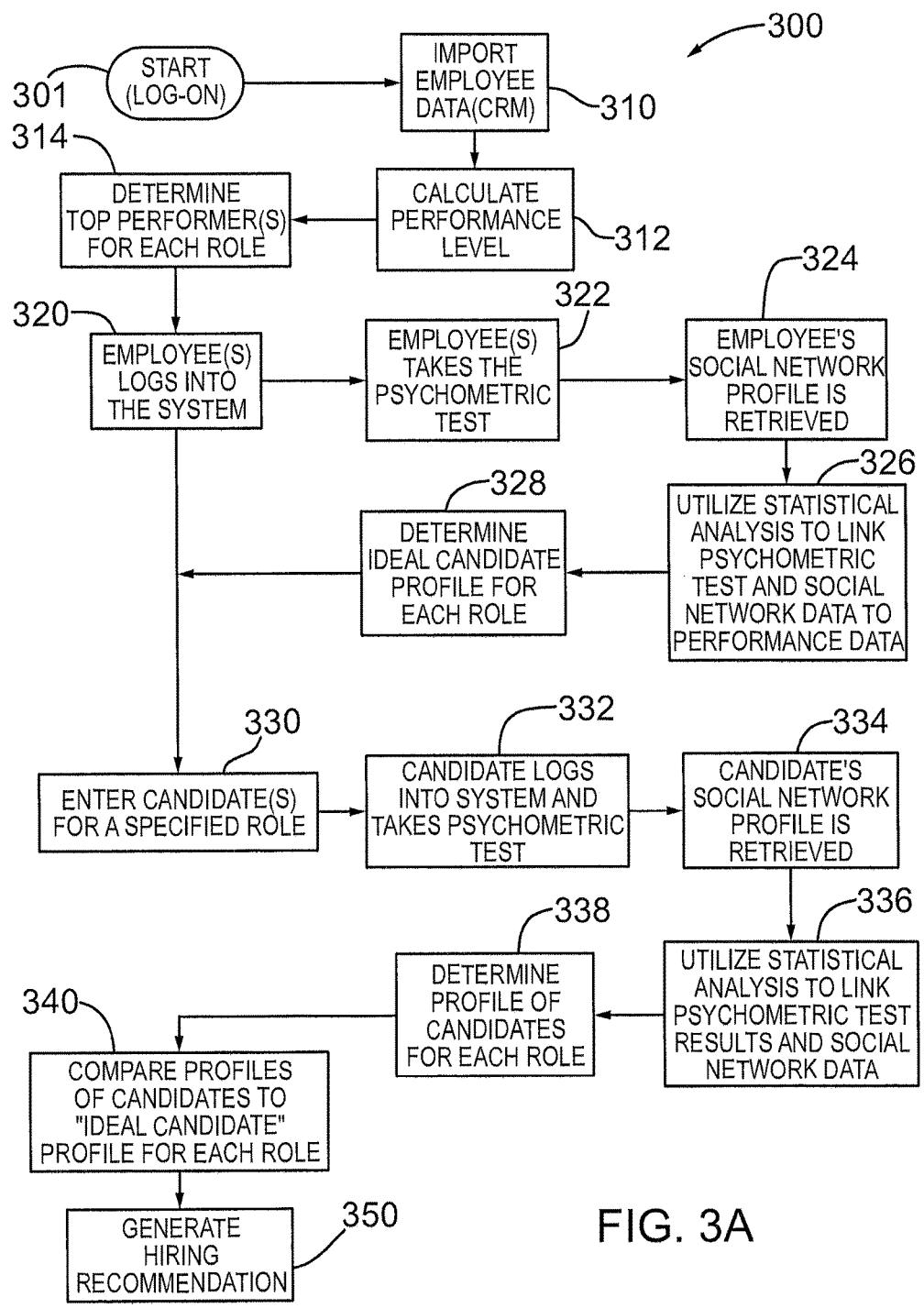
FIG. 3A shows in flowchart form a process for determining the suitability of a candidate for a role in an organization according to an embodiment of the present invention.

Reference is next made to FIG. 3A, which shows in flowchart form a process for identifying a candidate suitable for a position or a role in an organization, company or other form of an enterprise, for example, an employee in the sales department of a company. The process for identifying a suitable candidate is indicated generally by reference 300 in FIG. 3A, and will be described in the context of a candidate or applicant for a sales position with a company. It will, however, be appreciated that the embodiments of the present invention as described herein are suitable for other types of positions or roles and may also have wider application to other types of candidate selection operations or decision making.

Figure 5A:
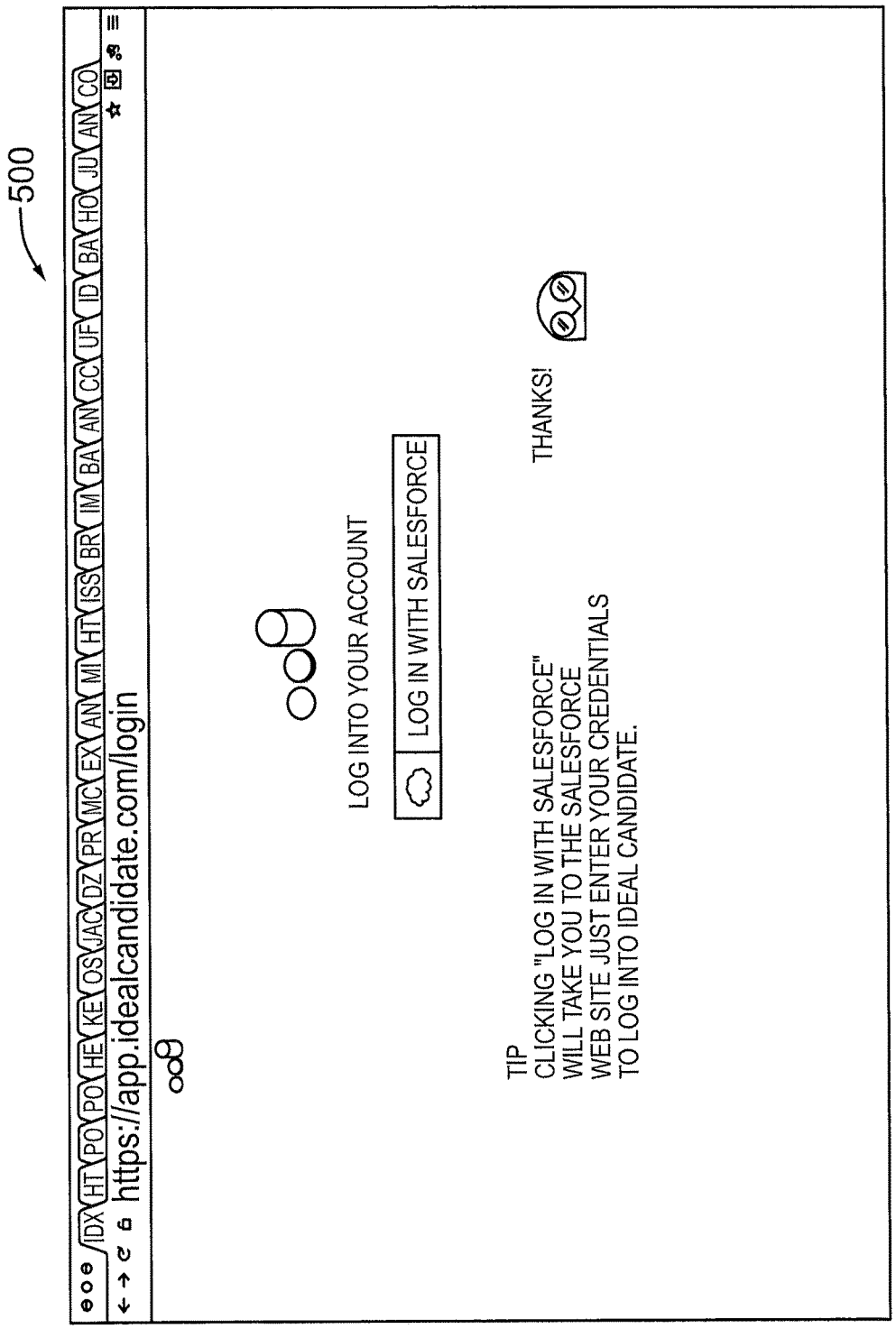
FIGS. 5A to 5G are screenshots illustrating a process for retrieving data and information for current employees of a company or organization from a Customer Relationship Management (CRM) system or other type of database system.
Figure 5B:
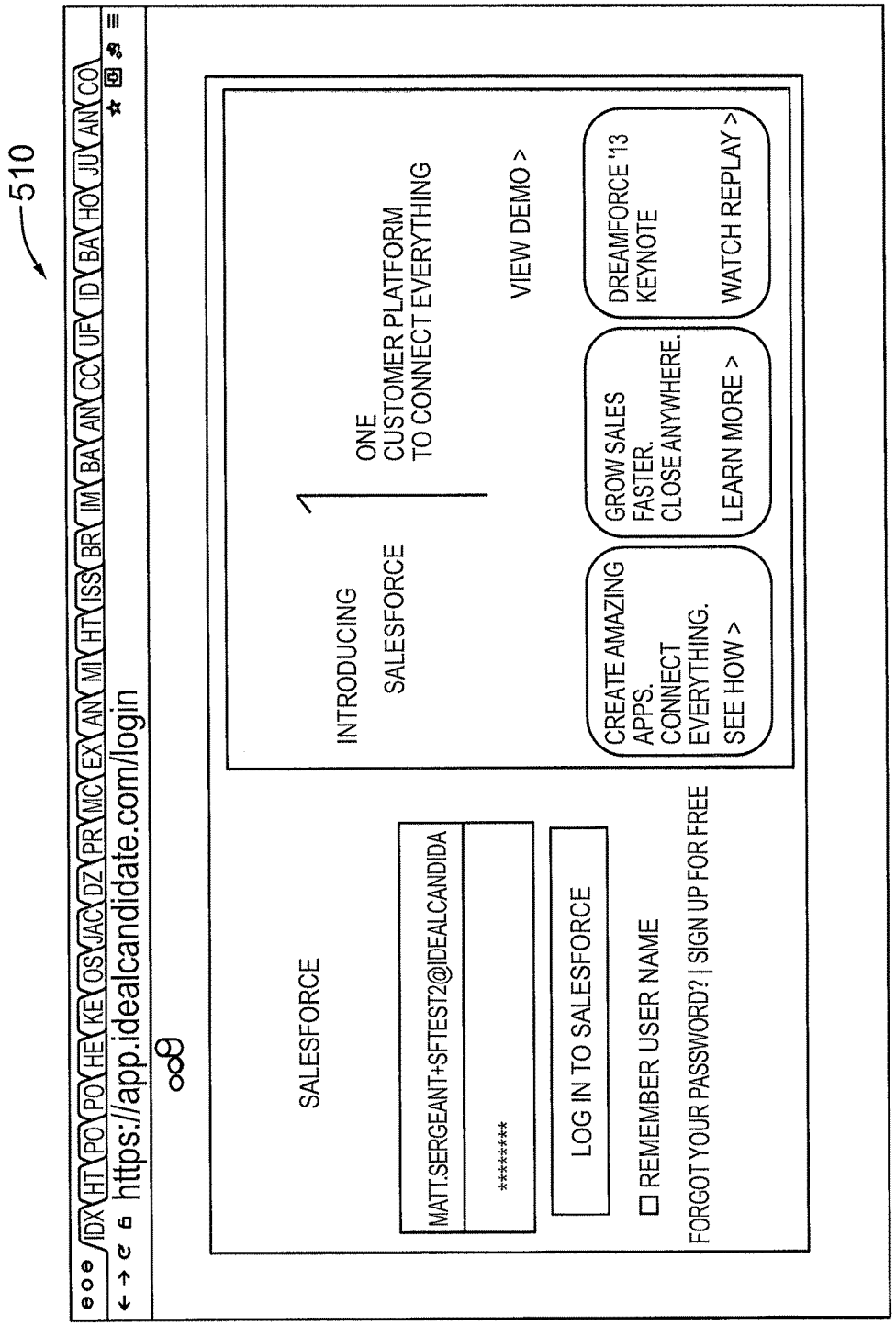
Figure 5C:
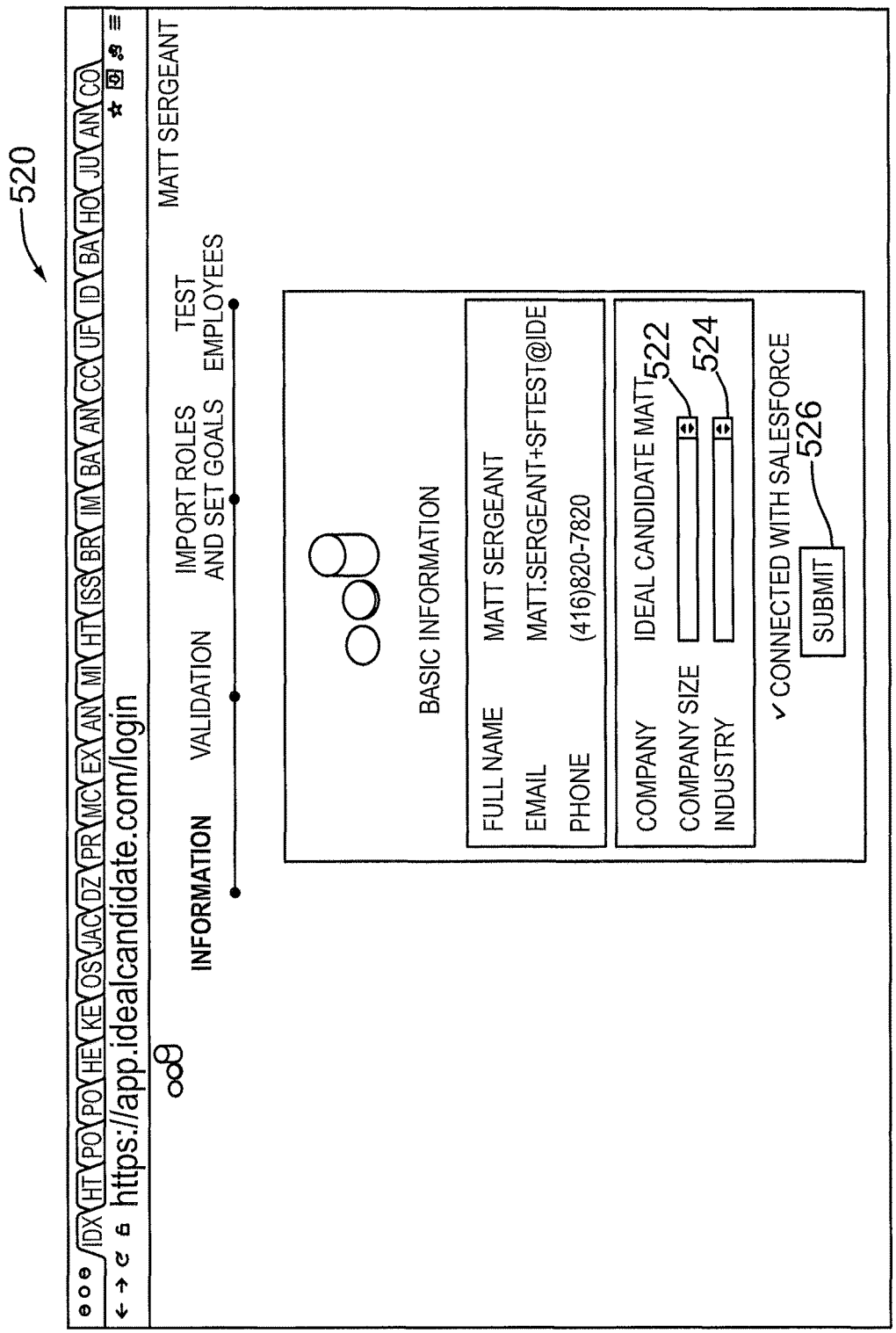
Figure 5D:
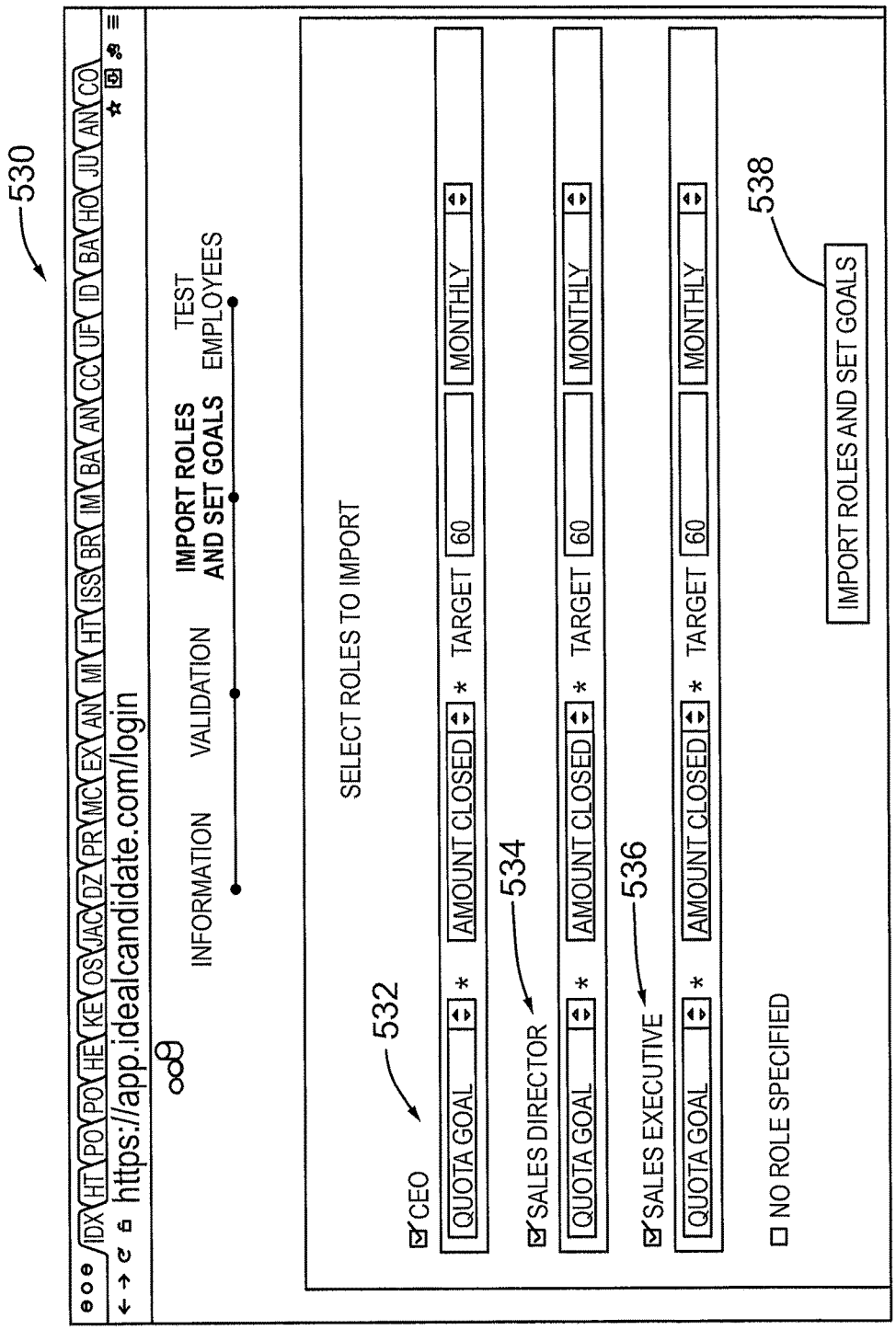
Figure 5E:
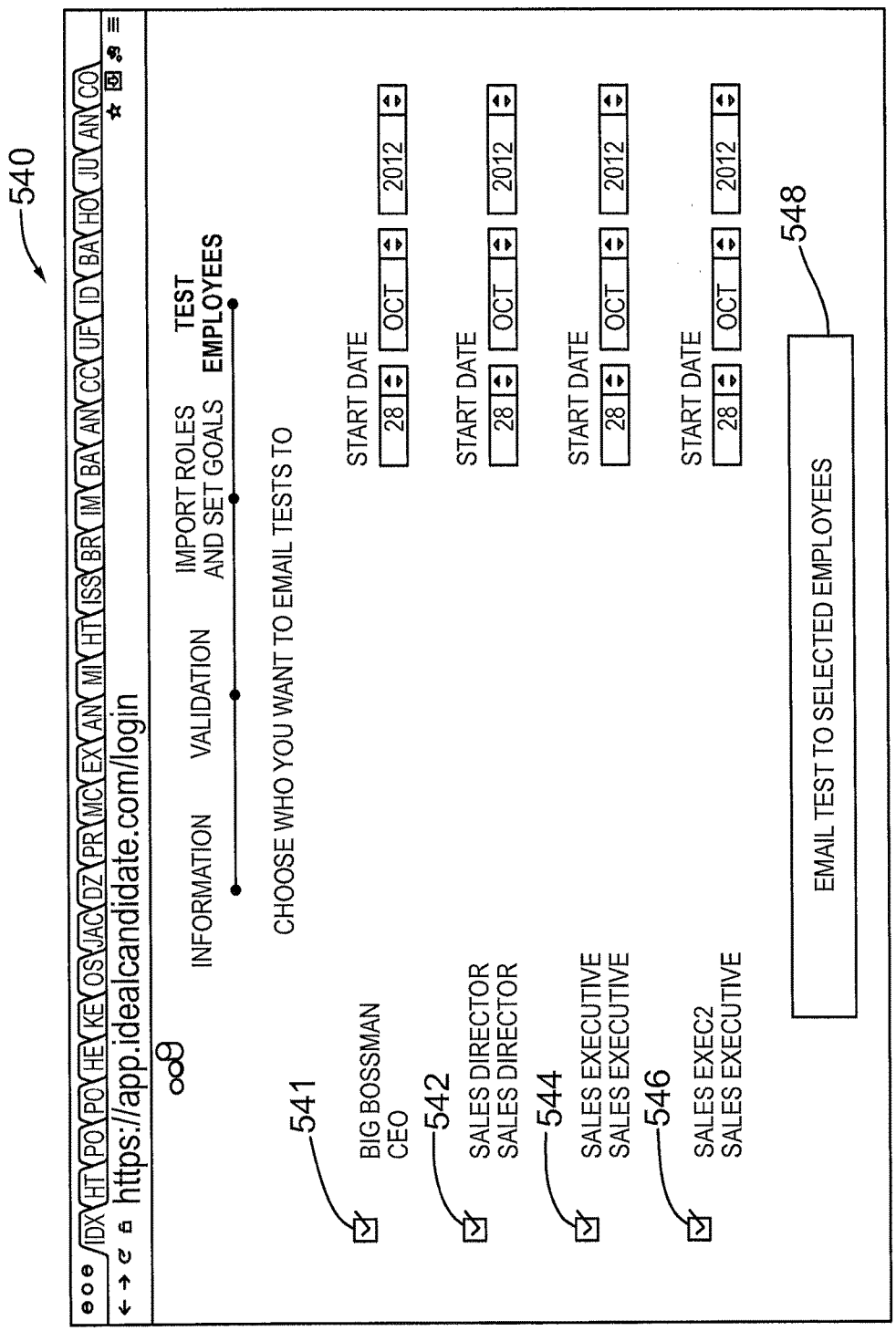

As shown in FIG. 3A, the first operation indicated by reference 301 comprises a user, for example, a human resource manager or hiring manager, logging into the system 100 (FIG. 1), for example, utilizing a "Log into your Account" page or screen 500 as depicted in FIG. 5A. Next in 310, the user imports data, i.e. performance data, for current employees of the organization or company. According to an exemplary embodiment, the data comprises current sales employee(s) data from a customer relationship management system (CRM), and the system 100 is configured to provide a login page for the CRM system (i.e. by downloading a webpage to the client machine 130a being used by the hiring manager), for example, using a "salesforce.com" login page 510 as shown in FIG. 5B. The system 100 may be configured to display a "Basic Information" page or screen as shown in FIG. 5C and indicated generally by reference 520. According to an exemplary embodiment, the Basic Information page 520 is configured with user activated inputs (i.e. drop-down lists) for specifying "Company Size" 522 and "Industry" 524, and a "Submit" button 526 for entering the specified information into the system 100. The system 100 is configured to generate and display a "Select Roles to Import" page or screen 530 for example having a form as shown in FIG. 5D. The Select Roles to Import page 530 is configured to provide a user (e.g. the hiring manager) to select one or more roles within the organization for which data (e.g. performance data) will be retrieved or associated, and an "Ideal Candidate" profile generated as described in more detail below. As shown in FIG. 5D, the Select Roles to Import page 530 is configured with a "CEO" role 532, a "Sales Director" role 534 and a "Sales Executive" role 536. The system 100 may also be configured to generate a "Choose who you want to email tests to" page or screen 540 as shown in FIG. 5E, and is further configured to prompt the employee(s) to log into the system 100 and takes the test(s), for example, as described in more detail below in 320 and 322. As shown in FIG. 5E, the selected employees are "Big Bossman" 541 in the CEO role, "Sales Director" 542 in the Sales Director role, "Sales Executive" 544 in the Sales Executive role, and "Sales Exec2" 546 also in the Sales Executive role. The operation is completed by the user (i.e. hiring manager) clicking an "Email Test to Selected Employees" button or input 548.

Figure 5F:
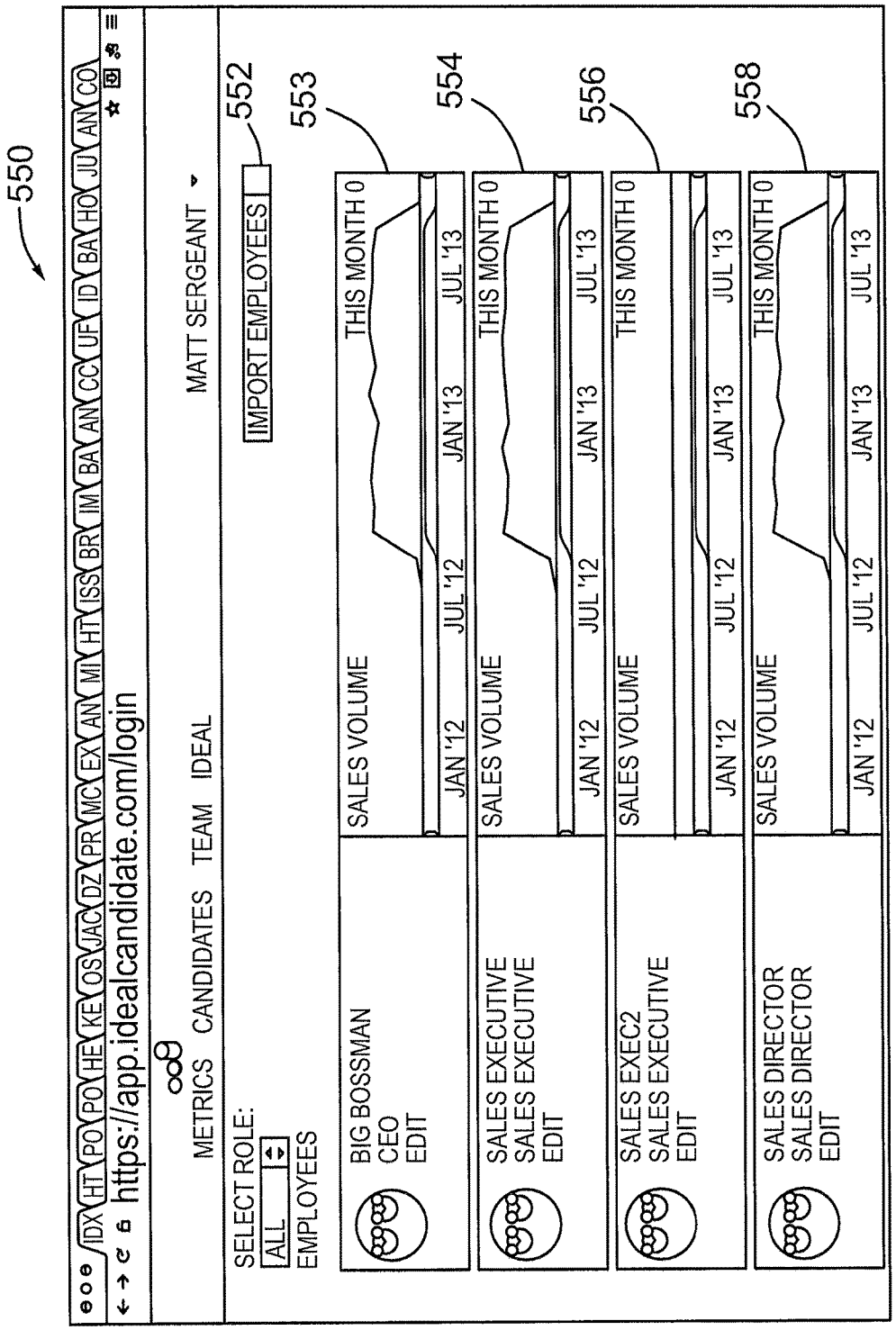
Figure 5G:
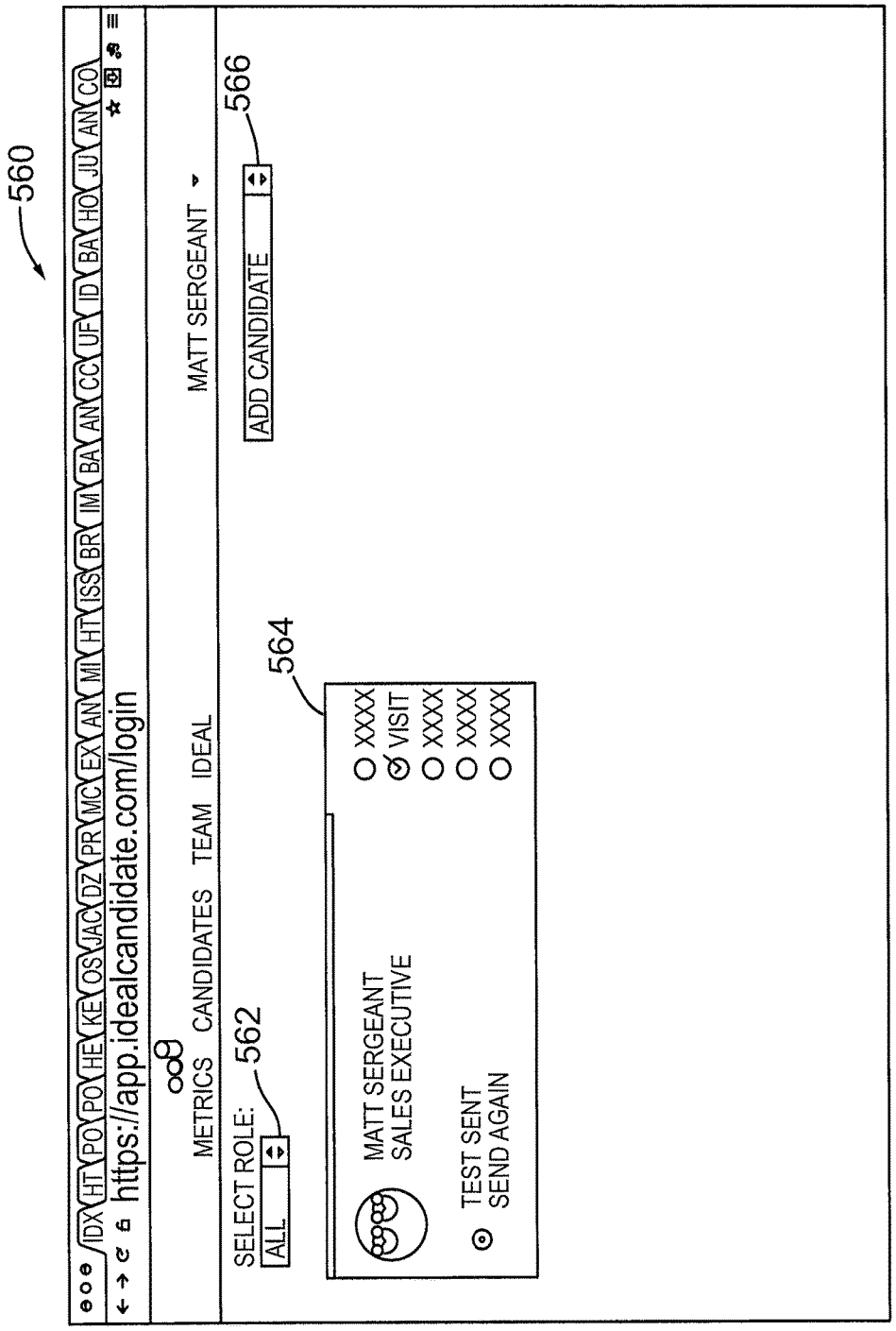

Reference is next to FIG. 5F, which shows an "Import Employees" data webpage or screen indicated generally by reference 550. The "Import Employees" data page 550 is configured with an "Import Employees" button or input control 552 in the system 100 to import the performance data associated with each of the selected employees/roles. In this exemplary implementation, Import Employees data page is configured to show "Sales Volume" 553 associated with Big Bossman CEO, "Sales Volume" 554 associated with Sales Executive, "Sales Volume" 556 associated with Sales Exec2, and "Sales Volume" 558 associated with Sales Director), where the sales volume data is retrieved or read from one or more databases associated with "salesforce.com". As will be described in more detail below, the system 100 is configured to utilize the performance data, e.g. sales volume data, to generate an "Ideal Candidate" profile for each of the selected roles. The system 100 may also be configured with an "Add Candidate" page or screen as shown in FIG. 5G and indicated generally by reference 560. According to an embodiment, the Add Candidate page 560 is configured with a "Select Role" drop down list box 562, a candidate display window or panel 564 and an "Add Candidate" button or input 566.

According to an embodiment, the system 100 is configured to generate an "Ideal Candidate" profile based on selected employee(s), e.g, a top performer, or top performers, selected or identified from one or more employees in the organization as described in more detail below. According to another embodiment, the system 100 is configured to generate an "Ideal Candidate" profile based on performance data and other information associated with the selected role or roles in an organization.

Referring back to FIG. 3A, the system 100 is configured to calculate a performance level for each of the employees based on the performance data retrieved (for example, the sales volume data from the salesforce.com database) as indicated in 312. In the example of FIG. 5F, for the role of "Sales Executive", the Sales Executive employee has better performance data (e.g. sales volume) over the Sales Exec2 employee. The system 100 is further configured to determine a top performer (e.g. employee), or top performer (e.g. employees), for each of the selected or defined roles as indicated in 314. Next in 320, employee(s) log onto the system 100, for example, in response to a prompt or embedded link in the email that is generated and sent utilizing the "Choose who you want to email tests to" page 540 as described above with reference to FIG. 5E.

Figure 6B:
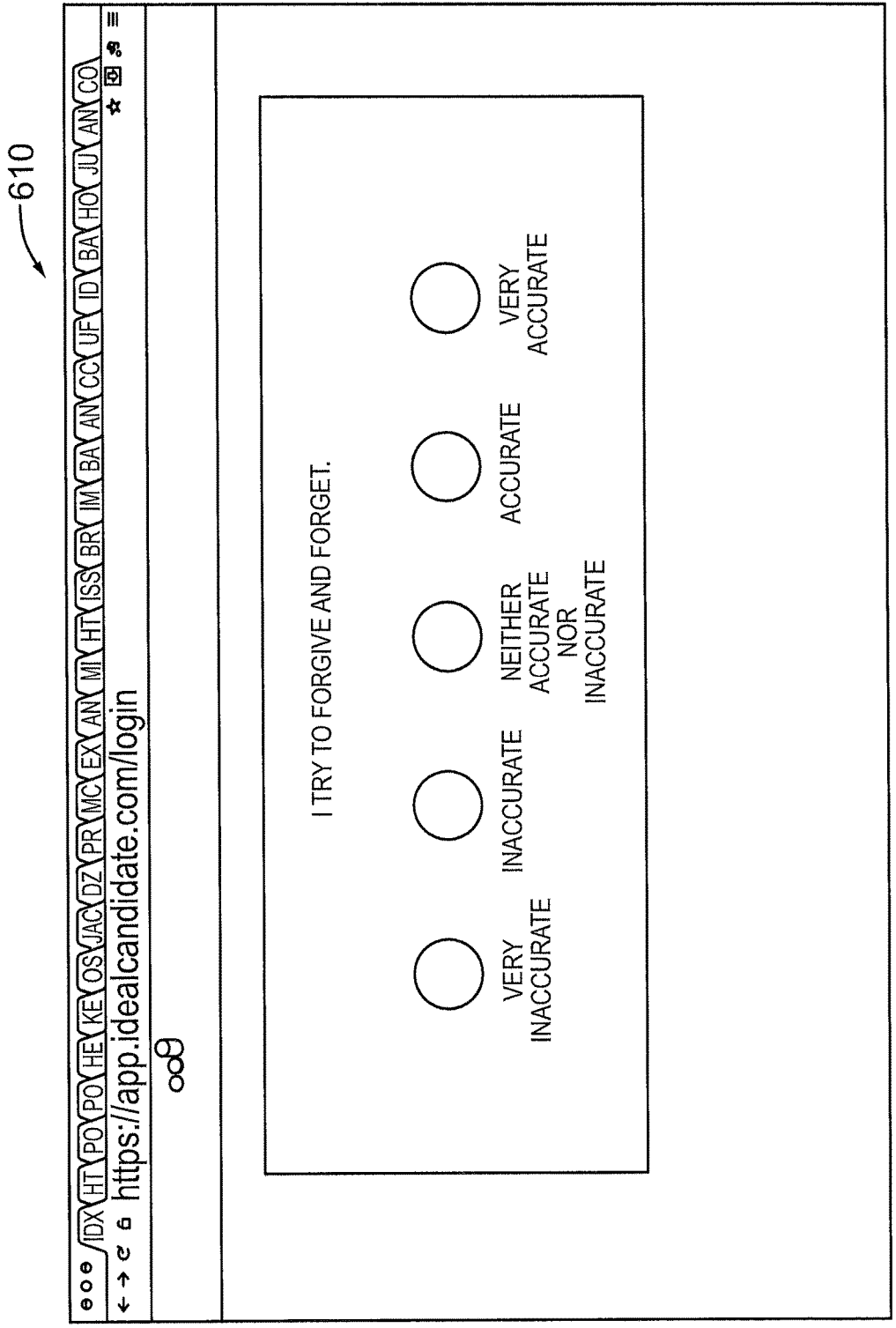
Figure 6C:
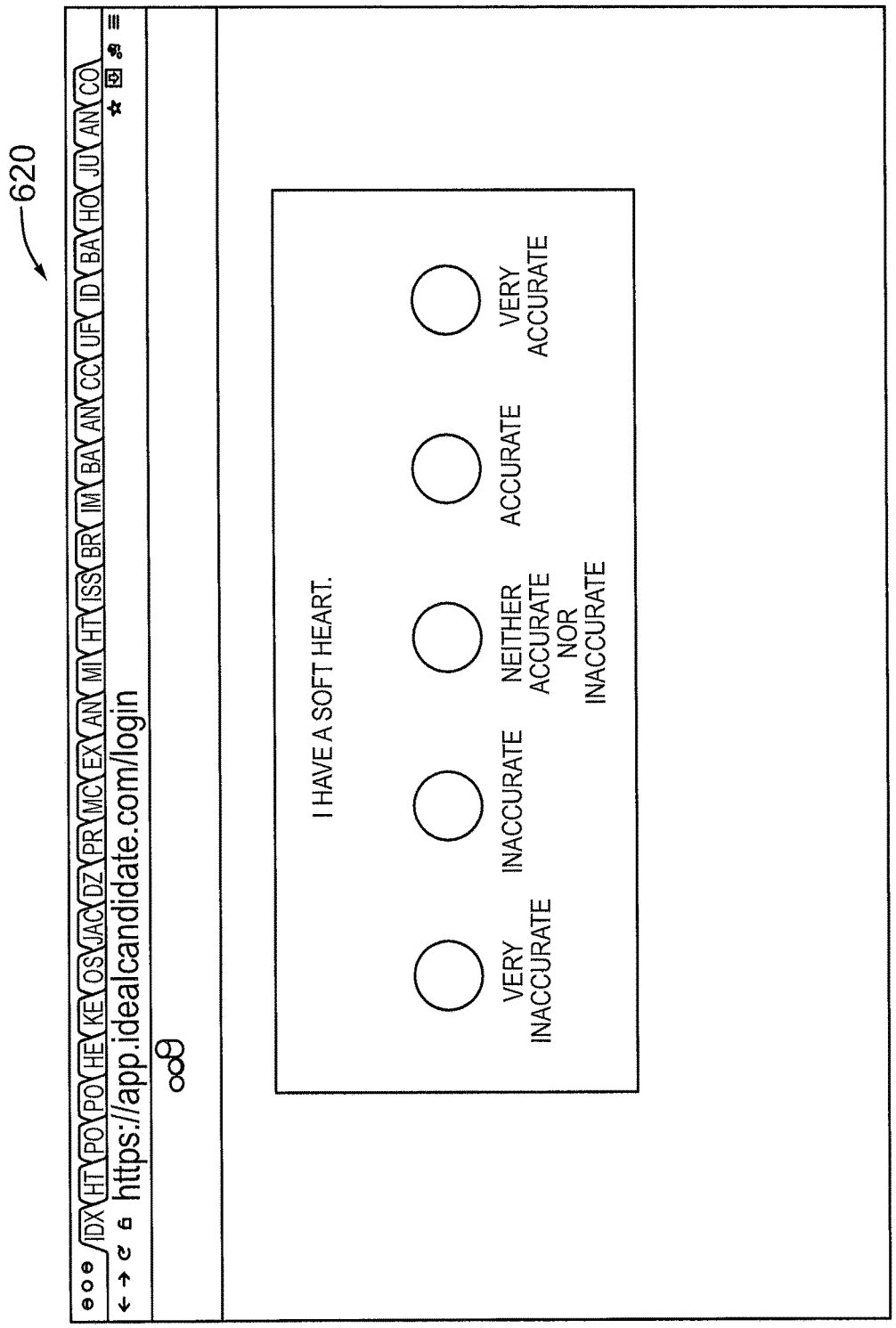
Figure 6D:
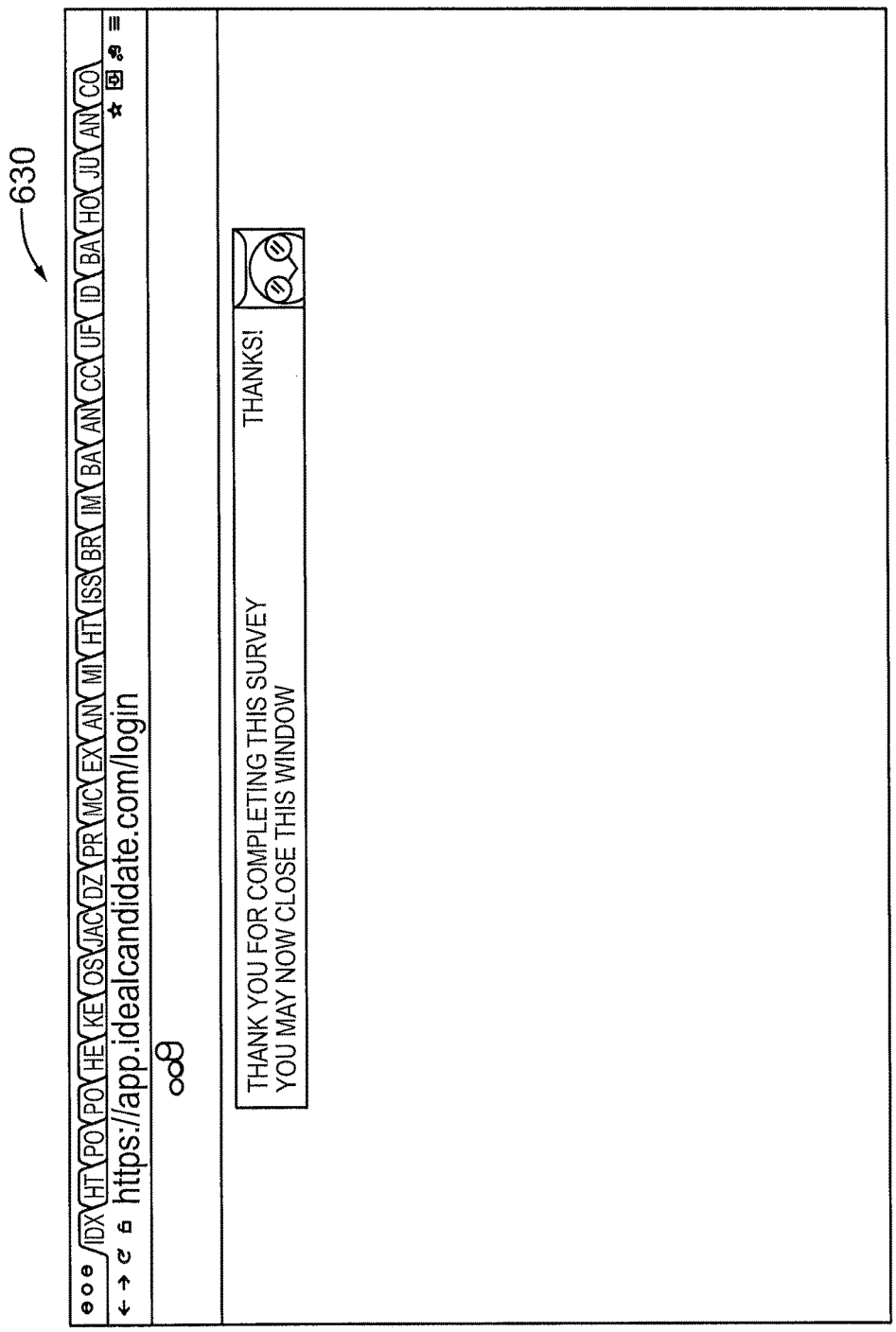

As shown in 322, the system 100 is configured to prompt the employee to take a psychometric test as part of the process 300. According to an embodiment, the psychometric test is configured as an online test and comprises three components or sections: (1) personality; (2) emotional intelligence; and (3) selling motivation, orientation, and skills. It will be appreciated that the psychometric test may comprise additional or other types of testing components. It will further be appreciated that the psychometric test items or predictors will be selected on the basis of characteristics associated with a candidate for a particular role or position in an organization. In the context of a sales type position, the psychometric test items utilized in the psychometric test are based on performance type criteria, and secondly, relate to marketable attributes for a client looking to fill a certain type of role. According to an embodiment, the psychometric test is configured to produce results that are aggregated into several domains, and each domain includes a weighting factor that is applied. The weighting factor indicates a significance of the domain to the ability of an employee (or candidate) to perform within a selected role, e.g. generate sales volume within a sales position in an organization. Aspects or components of an exemplary psychometric test according to embodiment of the present invention are depicted in FIGS. 6A to 6D. The psychometric test comprises an "Instructions" page or screen as depicted in FIG. 6A and indicated generally by reference 600. FIG. 6B shows an exemplary personality test section page or screen 610 configured with a personality question/answers related to forgiveness. FIG. 6C shows another exemplary personality test section page or screen 620 configured with a personality question/answer related to compassion. The implementation particulars associated with other personality test questions/answers, emotional intelligence and selling motivation may be implemented in known manner as will be readily understood by those skilled in the art. The system 100 is configured to conclude the online psychometric testing with a "Thank You" page or screen 630, for example, having a form as shown in FIG. 6D.

The next step in the process 300 comprises entering and/or retrieving information associated with the employee as indicated by reference 324 in FIG. 3A. According to one aspect or an exemplary implementation, the system 100 is configured to import or retrieve information associated with the employee, and the information may comprise social networking data, employment history, and/or education history. All or some of this information may be utilized as additional domains to generate an "Ideal Candidate" profile, for example, as described in more detail below. According to an exemplary embodiment, the social networking data comprises data and information contained in or imported from a LinkedIn™ account associated with the employee, and may include network size, recommendations, publications, skills, certifications and/or volunteer work.

The process 300 includes as indicated in 326 an algorithm configured to determine an overall ability for each of the employees (and candidates) based on the domains derived from the performance data, the psychometric test results, the social networking data and additional information (employment history and/or education history).

Figure 7A:
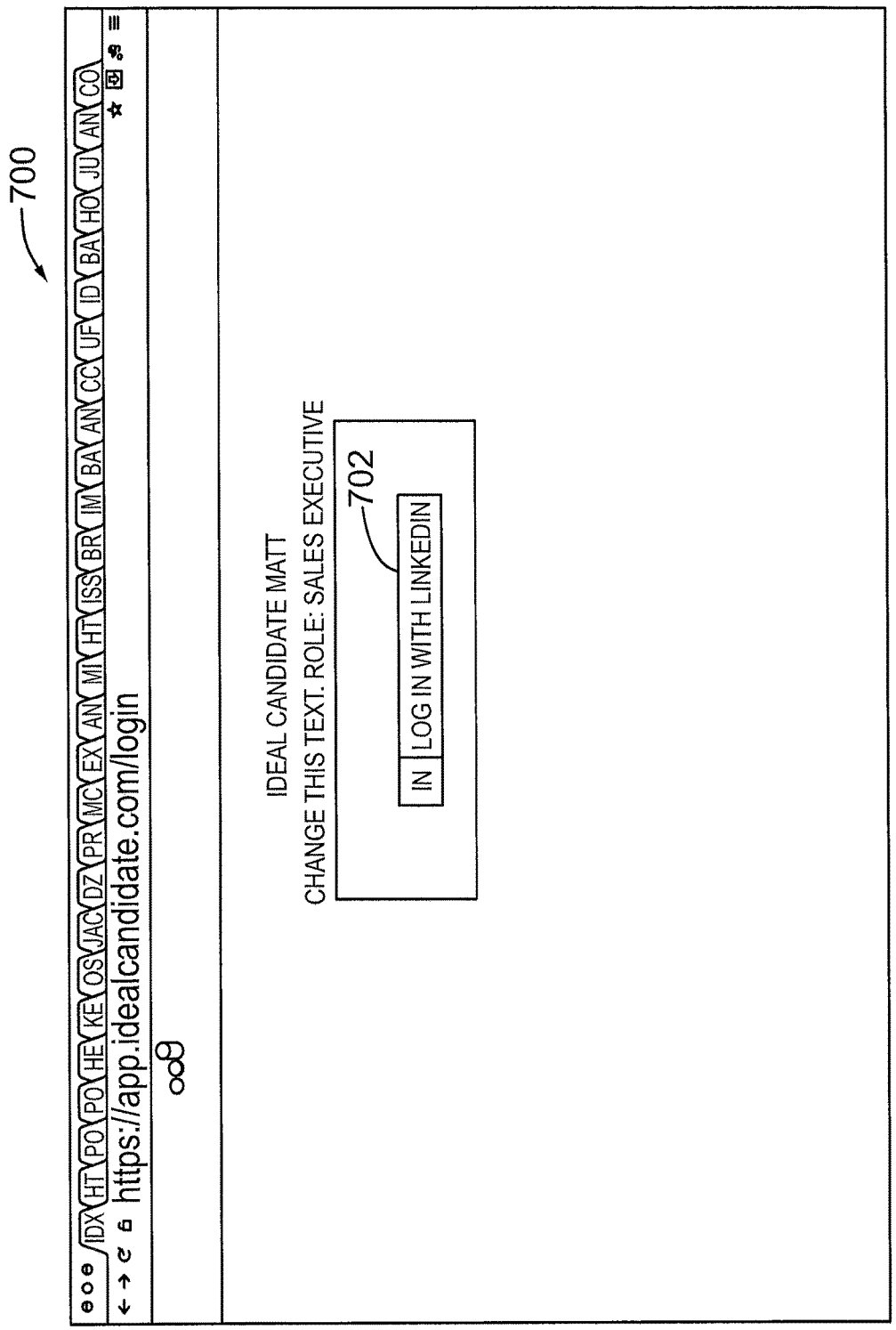
Figure 7B:
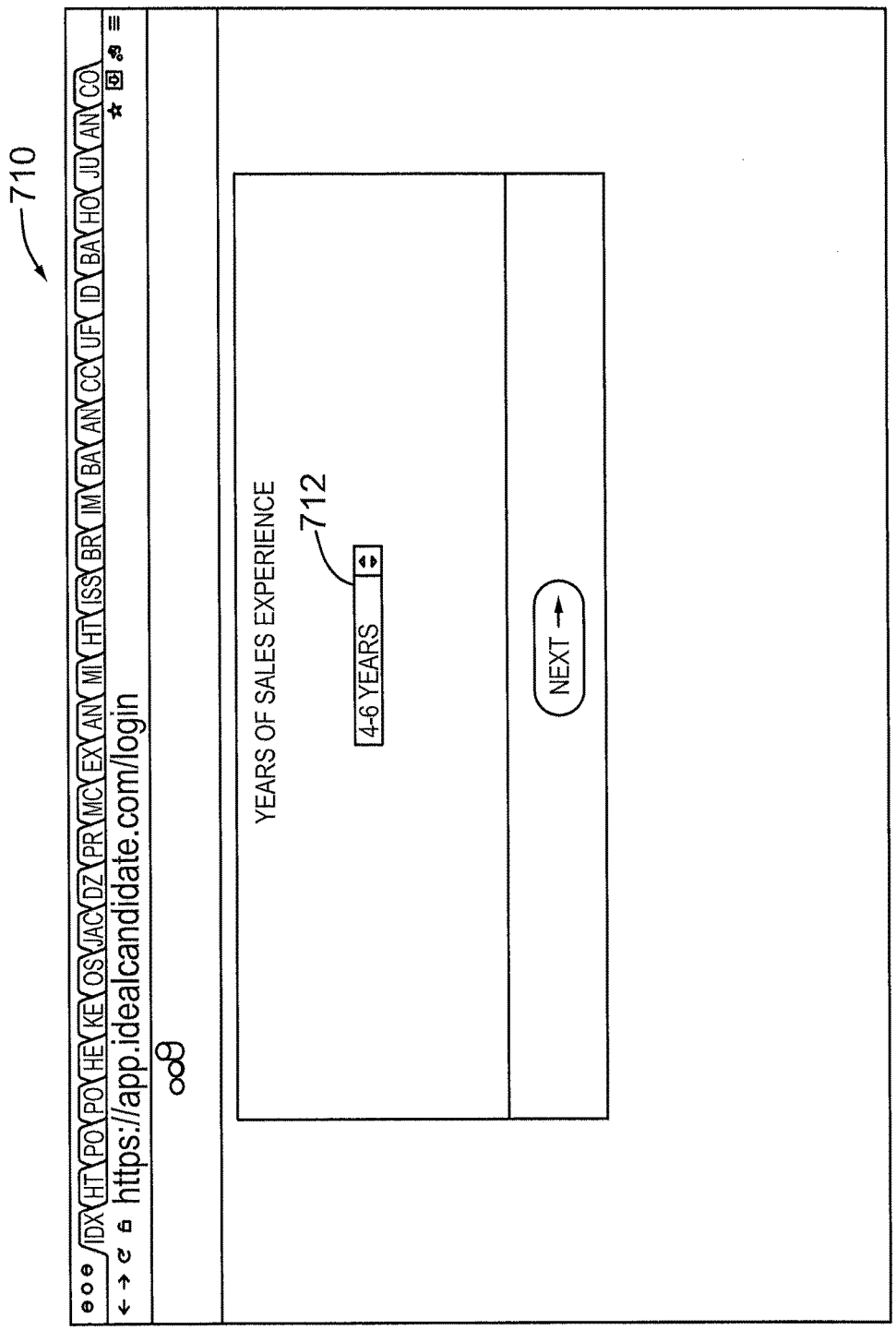
Figure 7C:
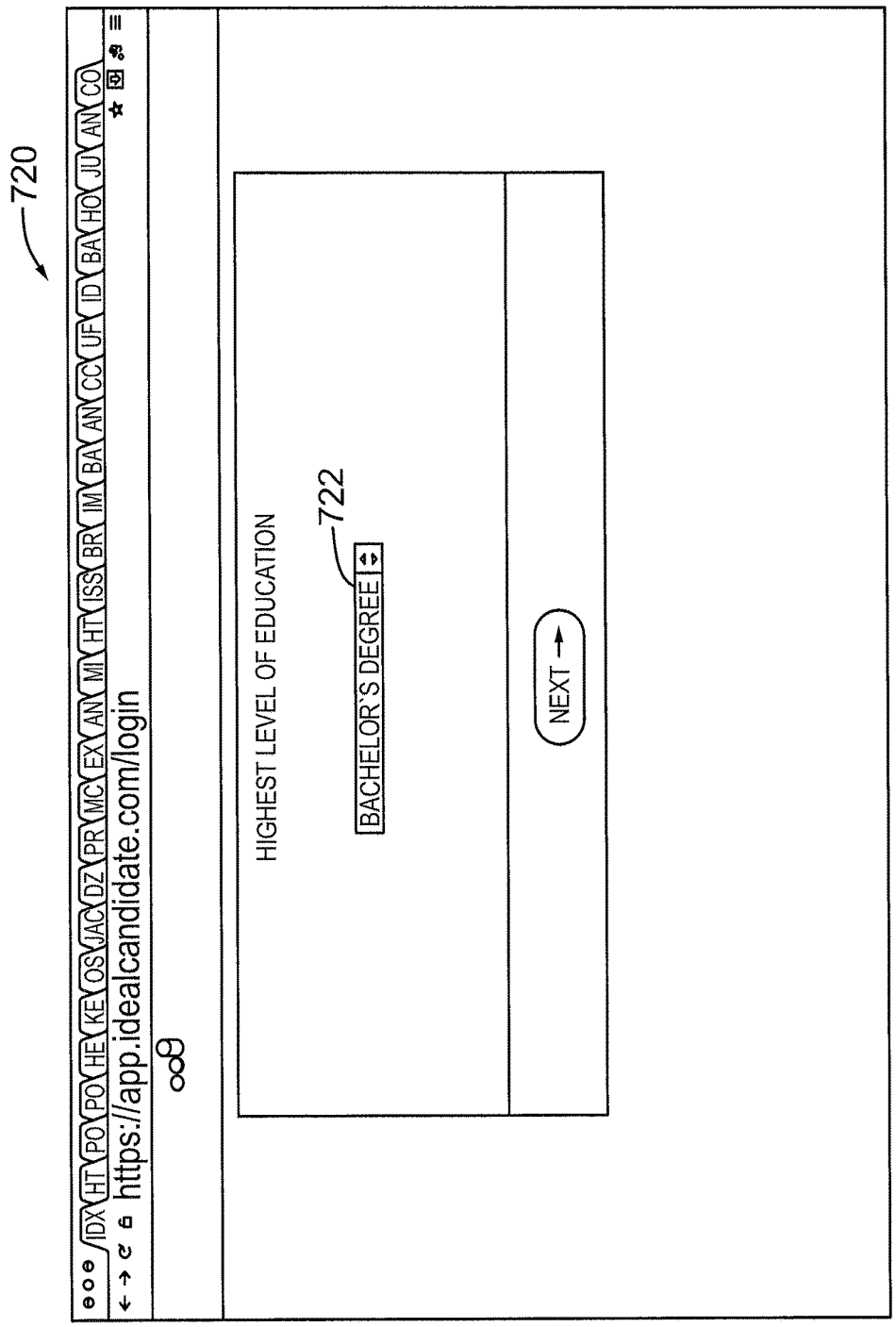
Figure 7D:
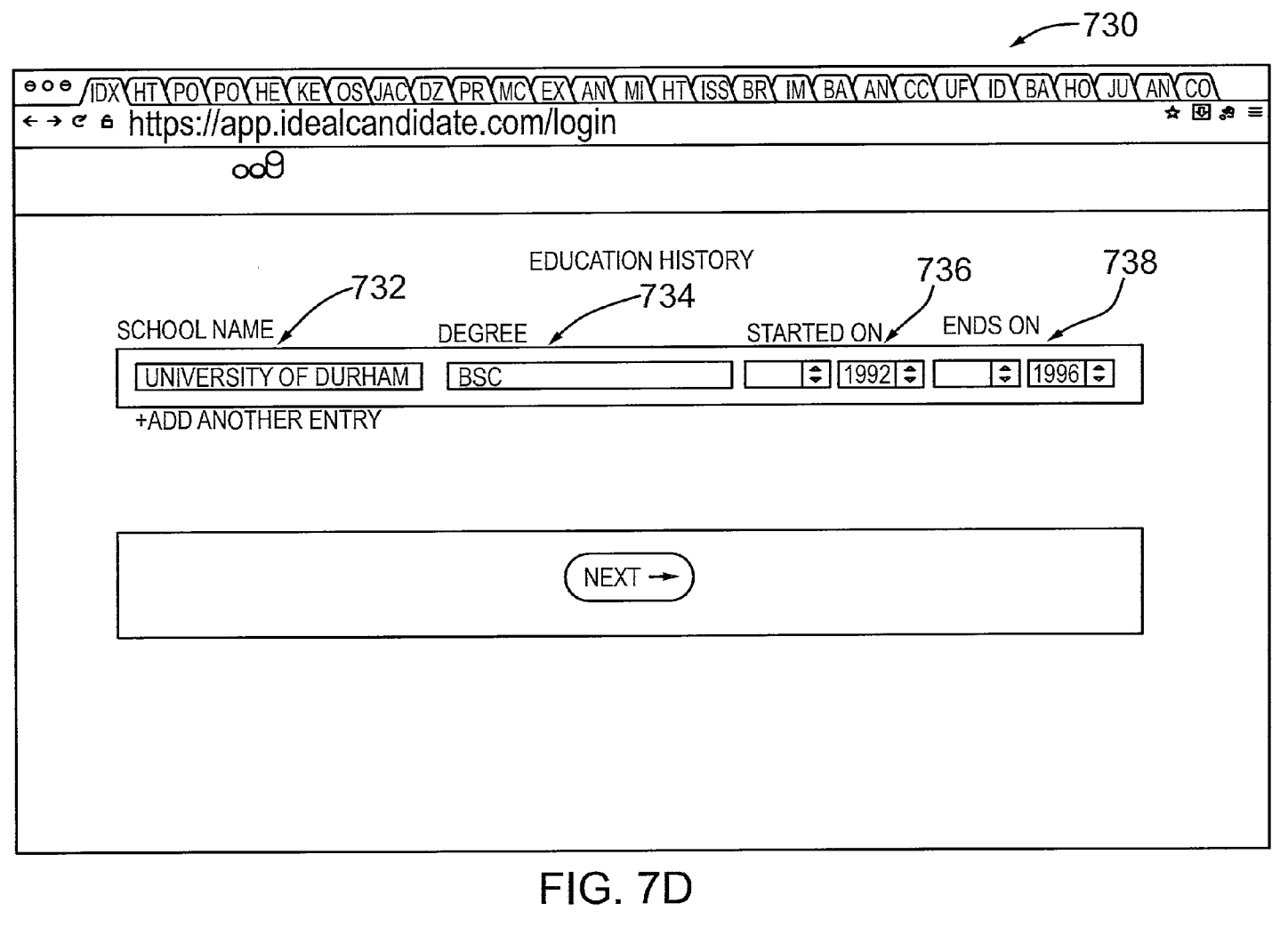

According to an exemplary implementation, the system 100 includes pages or screens for providing, e.g. collecting or importing, additional information related to an employee (and/or candidate) for example, as shown in FIGS. 7A to 7E. FIG. 7A comprises a landing page or screen 700 and includes a "Log in with LinkedIn" button 702 configured to allow a user (e.g. an employee) to log in with their LinkedIn account. According to an exemplary implementation, the system 100 is configured to import data and information from the social network (e.g. LinkedIn account) associated with the employee or candidate (e.g. after the employee or the candidate has logged into their social network account) and populates the pages, for example, as described below. According to another aspect, the system 100 may be configured to allow the employee or candidate to edit or change information or data imported from the social network. FIG. 7B shows a "Years of Sales Experience" page or screen indicated generally by reference 710. The Years of Sales page 710 is configured with a drop-down list box 712 that allows a user (e.g. an employee or a job candidate) to enter or edit their associated years of experience in the role or position. FIG. 7C shows a "Highest Level of Education" page or screen indicated generally by reference 720. The Highest Level of Education page 720 is configured with a drop-down list box 722 that allows a user (e.g. an employee or a job candidate) to select or change their highest level of education, e.g. "Bachelor's Degree", as shown in FIG. 7C. FIG. 7D shows a "Education History" page or screen indicated generally by reference 730. The Education History page 730 is configured to allow a user (e.g. an employee or a job candidate) to enter or change their education history, including for example, "School Name" 732, "Degree" 734, "Started On" (e.g, month, year) 736 and "Ended On" (e.g. month, year) 738, as shown in FIG. 7D. FIG. 7E shows an "Employment History" page or screen according to an embodiment and indicated generally by reference 740. The Employment History page 740 is configured to allow a user (e.g. an employee or a job candidate) to enter or edit their employment history, including for example, "Employer" 741, "Industry" 742, "Position" 744, "Started On" (e.g. month, year) 746 and "Ended On" (e.g. month, year) 748, as shown in FIG. 7E.

According to an exemplary embodiment, the algorithm is configured to generate a final score for the employee or the candidate based on the sum of scores in each domain multiplied by the associated weighting factor, for example, as follows:

$$\text{Ability} = \Sigma(\text{domain\_score} \times \text{domain\_weight})$$

According to an embodiment, the system 100 is configured to automatically adjust the domain weights to improve accuracy of the weights, and thereby improve matching for a given role, company, or on a global level. According to an exemplary implementation, the system 100 may utilize machine learning techniques, neural network(s) or similar mechanisms for performing the adjustments. According to an exemplary implementation, the system 100 is configured to execute a "Genetic Algorithm" or (GA) which adjust the weights by small amounts, randomly, and re-running a "fitness function". These operations are repeated until weights or weighting factors are determined that best fit all of the top performers, and don't fit as well the poor performers. Upon each adjustment, the algorithm calculates the new values for average scores (sum of domain scores multiplied by weights) of top performers and poor performers, and the difference between the two values is the value of the "fitness function". The end result of the GA execution is a set of weights for a given population (role, company or global) which accurately scores low performers at the low end of the scale and high performers at the high end of the scale. According to another aspect, these operations can be performed on a role, organization or entire system level, so that the determination is tailored down to very specific needs, for example, different roles may require different personality characteristics or levels of those characteristics to provide good candidates. It will be appreciated that in such cases a single or global personality profile will not be sufficient. As will be within the understanding of one skilled in the art, the genetic algorithm may be configured to stop on one or more criteria, including number of iterations, success of fitness function, manual input, etc.

According to an exemplary implementation, the system 100 is configured to perform all or some of the following statistical analysis operations:

mean of each of the profile domains (for an exemplary implementation, 18 profile domains)
    standard deviations of each of the 18 profile domains
    distribution of scores of each of the 18 profile domains
    internal reliability (e.g. utilizing Cronbach's alpha) of each of the 16 multi-item profile domains
    confirmatory factor analyses of each of the 16 multi-item profile domains
    inter-correlations between all 18 profile domains
    mean(s) of the performance metric(s)
    standard deviation(s) of the performance metric(s)
    distribution of scores of the performance metric(s) of choice
    correlations between all 18 profile domains and the performance metric(s)
    multiple regression analysis of all 18 profile domains and the performance metric(s)
    null hypothesis significance testing, confidence intervals, and/or Bayesian methods
    identifying the top performers (e.g. the top 20% (i.e., quintile) in productivity)
    mean of each of the 18 profile domains for the top performer(s)
    algorithm or process for calculating candidate's % Match (as described in more detail below)

Figure 10:
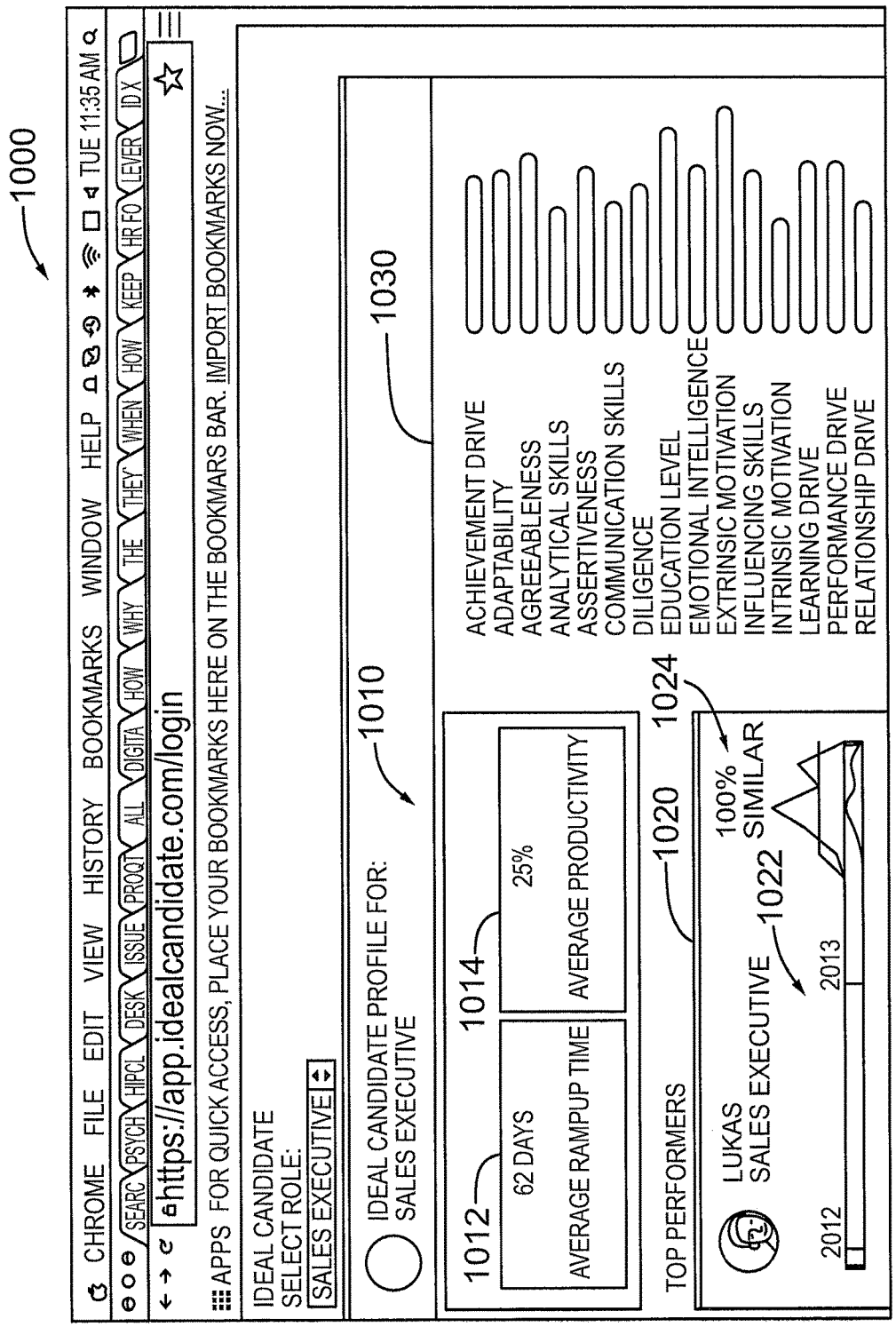
FIG. 10 is a screenshot of an exemplary ideal candidate profile generated for a selected role at an organization according to an embodiment of the present invention.

Upon completion of the analysis of the domains (as described above) for each of the employees, an employee profile is generated for each of the employees based on their selected role. According to an embodiment, the system 100 is configured through the process 300 to determine an "Ideal Candidate" profile for each role utilizing a statistical analysis based on the domains derived from the performance data of the employee(s), the psychometric test results of the employee(s), and/or the social networking data and/or additional information (employment history and/or education history) of the employee(s). As indicated in 328, the ideal candidate profile for each role may comprise the top performer for the role, e.g. the top performing employee of all the employees selected for the role. According to an exemplary embodiment for a sales position or role, the system 100 is configured to generate an ideal candidate profile page or screen as depicted in FIG. 10 and indicated generally by reference 1000. The Ideal Candidate profile page 1000 is configured to show an ideal candidate profile 1010 for a role in a company or organization, for example, a Sales Executive position in a company. As shown, the Ideal Candidate page 1000 is configured to show the ideal candidate profile 1010 and a top performer profile indicated by reference 1020. According to this example, the ideal candidate profile 1010 and the top performer profile 1020 are based on existing employees, e.g. "Sales Executive Lukas" of the company or organization. As shown in FIG. 10, the top performer profile 1020 for "Sales Executive Lukas" includes a graphical representation of performance data associated with Lukas and indicated generally by reference 1022. The top performer profile 1020 includes a % Similar field or indicator 1024. According to another aspect, the system 100 may be configured to generate and display an "Average Rampup Time" field or indicator 1012 and/or an "Average Productivity" field or indicator 1014. The process 300 is configured to perform a comparison function to generate a % Similar result or factor between the ideal candidate profile and the profile(s) for employees and/or candidates as described in more detail below. According to another aspect, the system 100 is configured to generate a psychometric test results window or panel as shown in FIG. 10 and indicated generally by reference 1030. According to an exemplary implementation, the psychometric test results window 1030 displays all or some of the psychometric test results, e.g. "Achievement Drive", "Adaptability", "Agreeableness", etc., associated with the ideal candidate profile. The process 300 is configured to execute a comparison between each of the employee profiles and the ideal candidate profile and the result of the comparison is presented in the % Similar field 1024. For example, the profile for Sales Executive Lukas is 100% similar to the Ideal Candidate profile as depicted in the % Similar field 1024.

Figure 8:
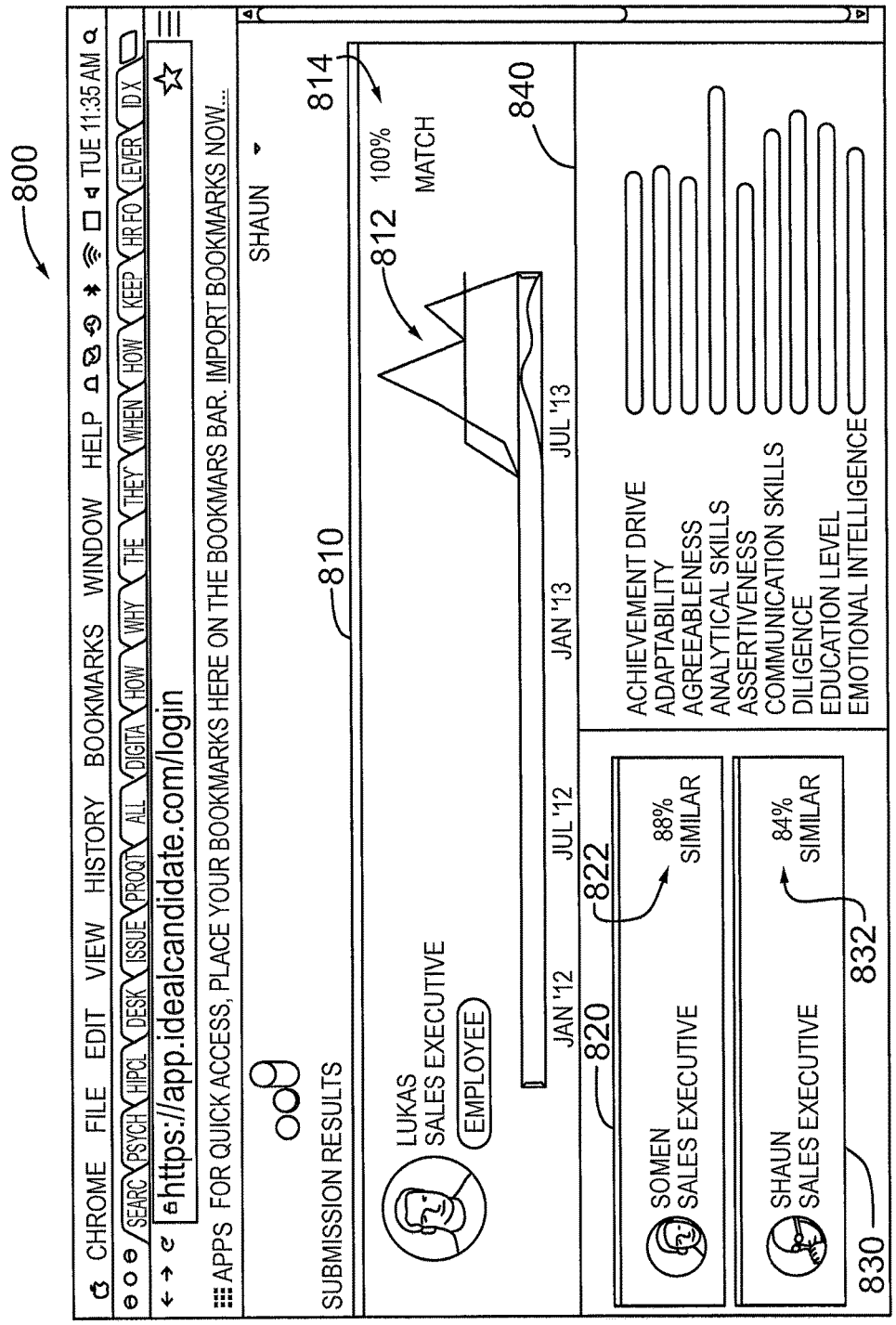
FIG. 8 is a screenshot of an exemplary employee profile generated for an existing member of an organization according to an embodiment of the present invention.

In 310, the process 300 is configured to allow a user, e.g. a hiring manager, to enter one or more employees for a specified role, e.g. a position in a company or an organization, for example, a sales executive. According to an exemplary embodiment for a sales position or role, the system 100 is configured to generate an employee profile page or screen as depicted in FIG. 8 and indicated generally by reference 800. The employee profile page 800 is configured to show an employee profile 810 and employee profiles 820 and 830. According to this example, the employee profile 810 and employee profiles 820, 830 are based on existing employees, e.g. "Sales Executive Lukas", "Sales Executive Somen" and "Sales Executive Shaun" of the company or organization. As shown in FIG. 8, the employee profile 810 for "Sales Executive Lukas" includes a graphical representation of performance data associated with Lukas and indicated generally by reference 812. The employee profile 810 includes a % Match field or indicator 814. The process 300 is configured to perform a comparison function to generate a % Match result or factor between the ideal candidate profile and the profile(s) for employees and/or candidates as described in more detail below. According to another aspect, the system 100 is configured to generate a psychometric test results window or panel as shown in FIG. 8 and indicated generally by reference 840. According to an exemplary implementation, the psychometric test results window 840 displays all or some of the psychometric test results, e.g. "Achievement Drive", "Adaptability", "Agreeableness", etc., associated with the selected profile, e.g, the employee profile 810 for Lukas. Similarly, if the employee profile 820 for "Sales Executive Somen" is selected, then the process 300 displays the test results associated with Somen in the psychometric test results window 840. As also shown in FIG. 8, each of the employee profiles 820 and 830 is also configured with a % Similar indicator or field indicated by references 822 and 832, respectively. The process 300 is configured to execute a comparison between each of the employee profiles and the ideal candidate profile and the result of the comparison is presented in the % Similar fields 822, 832 and the % Match field 814, respectively. For example, the profile for Sales Executive Lukas is a 100% Match with the ideal candidate profile as depicted in the % Match field 814, and 88% similar to Sales Executive Somen as depicted in the % Similar field 822.

In 330, the process 300 is configured to allow a user, e.g. hiring manager, to enter one or more potential candidates or "job candidates" for a specified role, e.g. a position in a company or organization, for example, a sales executive. If the "Ideal Candidate" profiles for each role have already been generated, for example, as described above utilizing selected employees of the company, then the system 100 can be configured to allow a user, i.e. the hiring manager, to proceed directly with 330. In 332, the job candidate logs into the system 100, for example, in response to an email with an embedded link, as described above with reference to 332. In 334, the system 100 is configured to import or retrieve information associated with the job candidate, and the information may comprise social networking data, employment history, and/or education history, for example, as described above with reference to 324 in the process 300. In 336, the process 300 is configured to utilize statistical analysis to determine a profile for each of the job candidates based on the domains derived from the psychometric test results of the candidate(s), an/or the social networking data and/or additional information (employment history and/or education history) candidates, for example, as described above with reference to 326. In 338, the process 300 is configured to determine a profile, e.g. a "candidate profile," for the job candidate for the selected role.

Referring back to FIG. 3A, the process 300 is configured in 340 to compare the profile (e.g. "the profile") of the job candidate to the "Ideal Candidate" profile (e.g. the top performer(s) in the selected role). According to an exemplary embodiment, the process 300 is configured to execute a % Match of the "job candidate" to the "ideal candidate", or a % Similar of the "job candidate" to an "existing employee", for example, utilizing an algorithm that comprises statistical analysis to determine the match for each of the job candidates based on the domains derived from the performance data of employee(s), the psychometric test results of employee(s) and/or candidate(s) and/or the social networking data and/or additional information (e.g. employment history and/or education history) of employee(s) and/or candidate(s). According to an exemplary implementation the compare operation comprises determining:

each profile domain in the equation is a ratio between the
    job candidate score and the ideal candidate (or employee) score:
      job candidate's score/ideal candidate's score or
      job candidate's score/employee's score It will be appreciated that the process 300 is configured to preserve the ratio between the scores while preventing inflated percentages (i.e. greater than the theoretical maximum percent for that particular domain).

Figure 9:
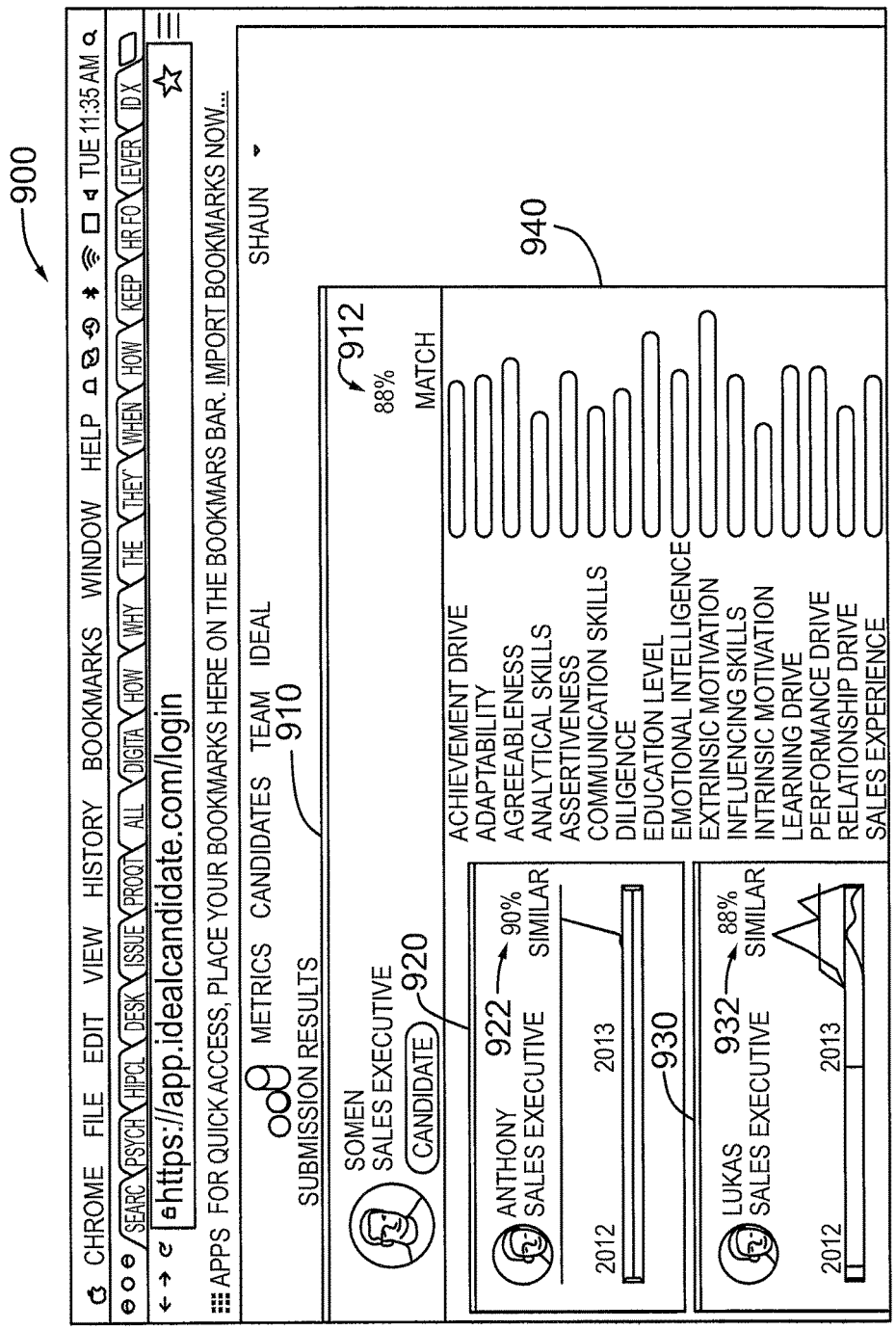
FIG. 9 is a screenshot of an exemplary profile generated for a candidate according to an embodiment of the present invention.

According to an embodiment, the system 100 is configured to generate a candidate profile page or screen having a form, for example, as depicted in FIG. 9 and indicated generally by reference 900. As shown in FIG. 9, the candidate profile page 900 includes a candidate profile (i.e. a "profile") 910 for the candidate, e.g. job applicant "Somen" for a "Sales Executive" position. The candidate profile 910 includes a % Match field or indicator 912. As described above, the process 300 is configured in 340 to perform a comparison function between the candidate profile for a candidate and the ideal candidate profile (e.g. the Ideal Candidate profile 810 for "Lukas" in FIG. 8) and generate a % Match result or factor, for example, an 88% match, which is presented in the % Match field 912. According to another aspect, the system 100 is configured to present the profiles for other employees in the selected role in the organization. For example, the candidate profile page 900 is configured to display an employee profile 920 for "Sales Executive Anthony" and an employee profile 930 for "Sales Executive Lukas". As shown, each of the profiles 920 and 930 includes an associated % Similar field 922 and 932, which are configured to present the percentage match between the existing employee and the candidate and provide another benchmark for assessing the profile candidate 910. According to another aspect, the system 100 is configured to generate a psychometric test results window or panel as indicated generally by reference 940. According to an exemplary implementation, the psychometric test results window 940 displays all or some of the psychometric test results, e.g. "Achievement Drive", "Adaptability", "Agreeableness", etc., associated with the selected profile, e.g. the candidate profile 910 for Somen.

According to another embodiment, the process 300 may be configured to calculate over-fit, as time passes, by checking newly hired job candidates based on performance, and/or psychometric test data, and/or social network data. Following this process, a poor performer who fits the weighting factors extremely well (and thus got hired) will yield an over-fit result. In accordance with one aspect, the system 100 is configured to maintain historical data on at least some candidates (e.g. newly hired job candidates), and track performance through to becoming an employee. According to an exemplary implementation, the system 100 is configured to assess the data associated with a newly hired job candidate after a ramp-up time. In a sales application, the ramp-up time may be defined as the time it takes for an employee to make effective sales, for example, by determining when the employee reaches 80% of their goal/target sales performance for two consecutive months. According to a further aspect, the system 100 is configured to feed back or otherwise import the over-fit data associated with the new hire into the Genetic Algorithm (GA) fitness function (described above), and the data may be utilized to re-adjust one or more the weights or weighting factors. The particular implementation details for the function will be readily understood by one skilled in the art.

Figure 3B:
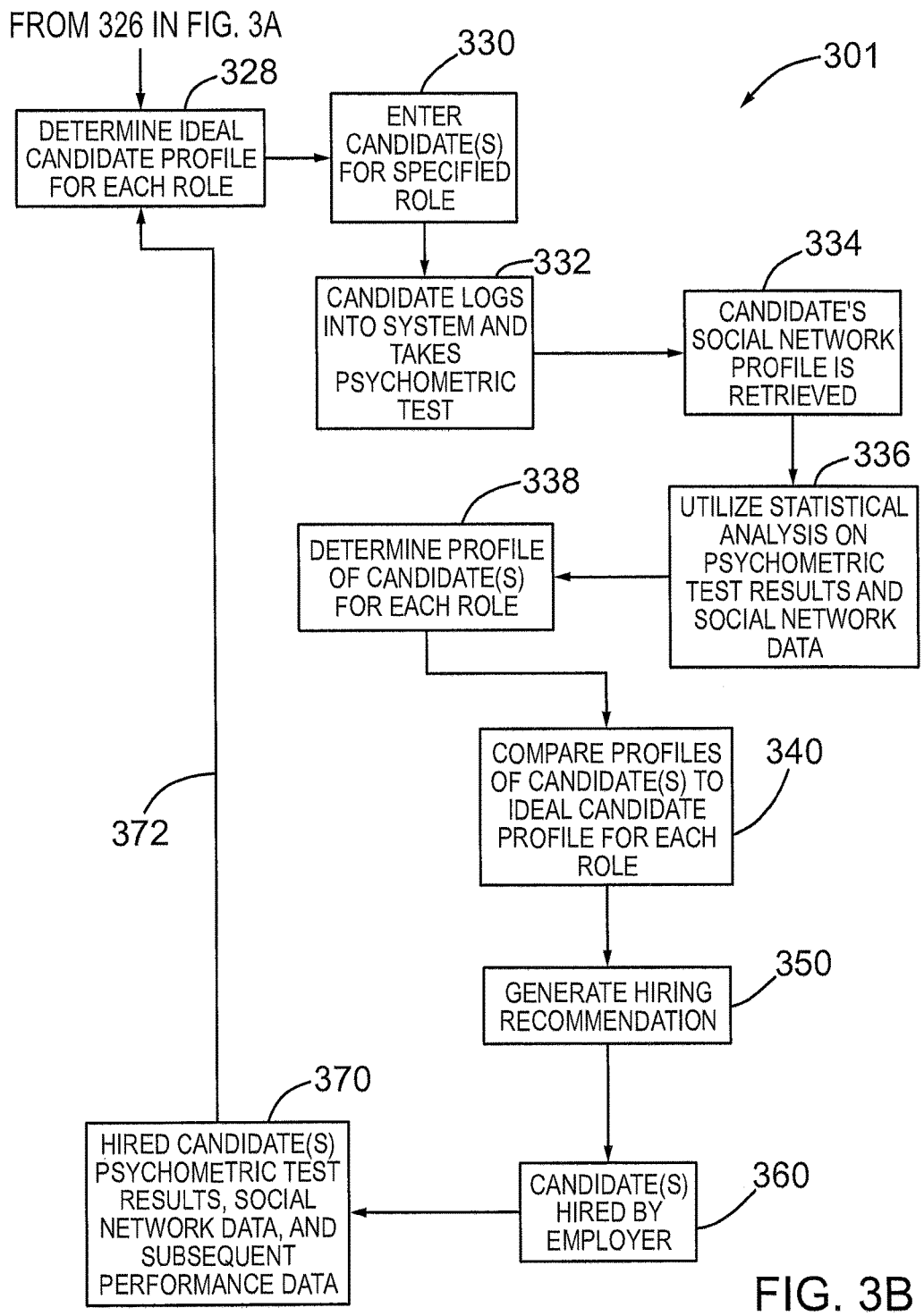
FIG. 3B shows the process of FIG. 3A configured with a processing loop for assessing performance associated with a candidate after being hired, according to an embodiment of the present invention.

According to an embodiment, the process is configured to include a re-assessment loop as shown in FIG. 3B and indicated generally by reference 301. The process 301 comprises in 360 the step or action of hiring the candidate based on hiring recommendation in 350 (as described above). The process 301 includes the operations as indicated in 370 of inputting ongoing data associated with the hired candidate, and including, psychometric test results, social network data and/or subsequent performance data. The inputted data is then applied in a re-assessment path or feedback loop as indicated by reference 372 to update the Ideal Candidate profile based on additional information and data from the hired candidate. It will be appreciated that in accordance with the embodiment, the Ideal Candidate profile provides an updated profile for the selected role and can be used or applied to assess the suitability of future candidates, e.g. job applicants.

Figure 4:
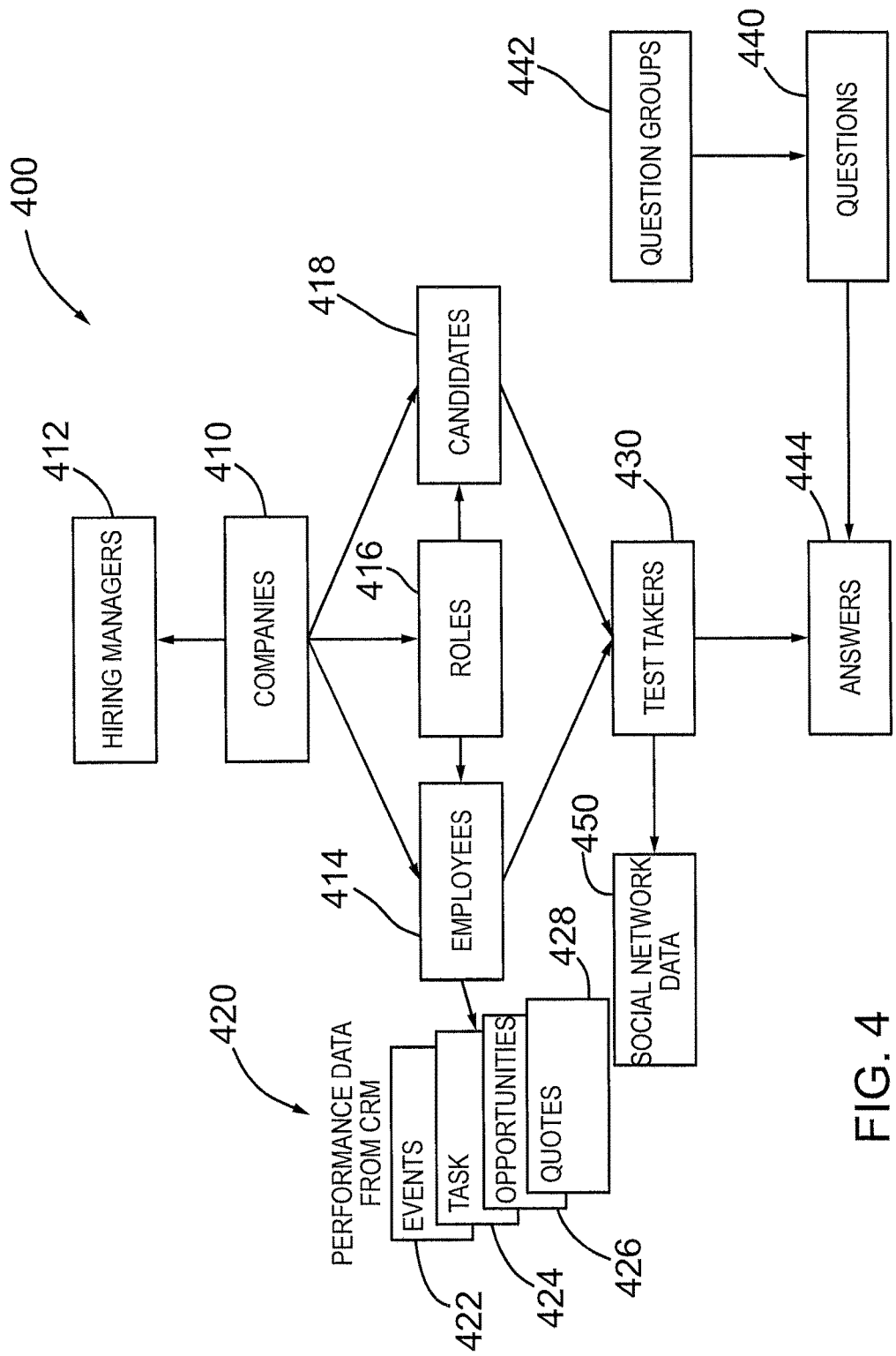
FIG. 4 is a block diagram showing an exemplary system architecture or database structure for the system of FIG. 1 according to an embodiment of the present invention.

Reference is next made to FIG. 4, which shows in block diagram an exemplary system architecture (e.g. database schema or database structure configured and stored in memory of the system 100, e.g. on the server 110 in FIG. 1) 400 for the system 100 of FIG. 1. According to an embodiment, the system architecture 400 comprises a plurality of objects defined in a database implemented on the server 110 (FIG. 1). As shown, the system architecture 400 includes a "Companies" object 410, a "Performance Data" object 420, a "Test Takers" object 430, a "Questions" object 440 and a "Social Network Data" object 450. The "Companies" object 410 represents an organization or company that is using the system 100. The Performance Data object 420 may be implemented utilizing a Customer Relationship Management or CRM module, for example, as described above. The Performance Data object 420 comprises an "Events" object 422, a "Tasks" object 424, an "Opportunities" object 426, and a "Quotas" object 428. The Companies object 410 includes a "Hiring Managers" object 412, an "Employees" object 414, a "Roles" object 416, and a "Candidates" object 418. The Hiring Managers object 412 comprise users who log into the system 100. There can be multiple hiring managers in a company or organization, and the system 100 is configured to allow multiple users (for example, running multiple instances) to view the same data. The Roles object 416 comprises job titles and may be imported from the customer relationship management (CRM) module. According to an exemplary embodiment, the system 100 is configured to import "employees" from the CRM for each role, and then for each employee, the system 100 imports "events", "task", "opportunities" and "quotas" data from the performance data object 420. The Test Takers 430 are associated with the candidates 418 and selected employees 414, i.e. the hiring manager chooses the employees for the psychometric tests as described above. The hiring manager adds candidates and the psychometric test requests are sent to those candidates, as described above. The Test Takers 430 (e.g. candidates and/or employees) may also include the Social Network Data object 450 which is imported, for example, from LinkedIn™ as described above. The Questions object 440 includes an Answer object 444 which are also associated with the Test Takers object 430. The Questions object 440 may also include also a "Questions Groups" object 442 comprising a set of questions that may be grouped together in various ways to display a profile for an employee or a job candidate. The particular implementation details for the system architecture 400 (or database schema or database structure) will be readily within the understanding of those skilled in the art.

The functionality and features associated with the system 100 comprising the server 110 and/or the application module or components 120 and/or the client machines 130 (FIG. 1), and/or the client interface module and pages or screens (FIGS. 5 to 9) as described above and in accordance with the embodiments may be implemented in the form of one or more software objects, components, or computer programs or program modules in the server and/or the client machines, for example, comprising a client or a server entity as described above with reference to FIG. 2. Further, at least some or all of the software objects, components or modules can be hard-coded into processing units and/or read only memories or other non-volatile storage media in the mobile communication device, server and/or other components or modules depicted in the drawings. The specific implementation details of the software objects and/or program modules will be within the knowledge and understanding of one skilled in the art.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A system for determining suitability of a candidate for a selected role in an organization, said system comprising:
   a processor operatively coupled to a database and including an input component configured to retrieve performance data associated with an ideal candidate;
   said processor including a component configured to generate an ideal candidate profile based on said performance data associated with said ideal candidate, wherein said ideal candidate profile comprises a best fit profile of one or more top performers associated with the organization, and said processor includes a machine learning component configured to generate said best fit profile based on said performance data;
   said processor including another input component configured to input data associated with the candidate;
   said processor including a component configured to generate a profile for the candidate based on said inputted data;
   said processor including a comparison component configured to compare said profile to said ideal candidate profile, and a component configured to generate a suitability rating for the selected role based on said comparison;
   said processor further including a re-assessment feedback loop configured to generate additional performance data based on information from a candidate hired based on said suitability rating, said additional performance data comprising actual performance data in said hired candidate's performance in the selected role after hiring, and said re-assessment feedback loop being configured to identify candidates with suitability ratings for the selected role above a threshold value whose additional performance data indicates a poor performance after an initial ramp-up time, said actual performance data for the identified candidates being outputted to said ideal candidate profile generation component; and
   said ideal candidate profile generation component being configured to further update said ideal candidate profile based on said actual performance data from the identified candidates and thereby provide an updated profile for the selected role having a set of weighting factors adjusted to avoid over-fitting of the updated profile to the one or more best performers.

2. The system as claimed in claim 1, wherein said suitability rating comprises a hiring recommendation.

3. The system as claimed in claim 2, wherein said processor further includes an evaluation module, said evaluation module including a component configured to input role performance data after the hiring of the candidate, and said evaluation component being configured to update the ideal candidate profile based on said inputted role performance data.

4. The system as claimed in claim 1, wherein said other input component is configured to input one or more of psychometric test results data associated with the candidate and social network based data associated with the candidate.

5. The system as claimed in claim 4, wherein said ideal candidate comprises an existing employee in the selected role in the organization, and said input component is configured to retrieve one or more of psychometric test results data associated with said existing employee and social network data associated with said existing employee.

6. The system as claimed in claim 1, wherein said ideal candidate component comprises executing an analysis component configured to generate said ideal candidate profile based on a sum of scores for each of a plurality of domains.

7. The system as claimed in claim 4, wherein said profile component comprises performing an analysis configured to generate said profile for the candidate based on a sum of scores for each of a plurality of domains.

8. A computer-implemented method for determining a suitability rating for a candidate for a selected role in an organization, said method comprising:
generating a best fit profile of at least one top performer associated with the organization based on said performance data at a machine learning component;
inputting data from a database associated with an ideal candidate for the selected role;
generating an ideal candidate profile for the selected role based on said inputted data, wherein said ideal candidate profile comprises said best fit profile;
collecting data associated with the candidate;
generating a profile for the candidate based on said collected data;
comparing said profile of the candidate to said ideal candidate profile; and
generating the suitability rating for the candidate for the selected role based on said comparison and comprising executing an algorithm configured to generate said suitability rating based on a sum of scores for each of a plurality of domains and wherein one or more of said plurality of domains includes an associated weighting factor
generating additional performance data based on information from a candidate hired based on said suitability rating, said additional performance data comprising actual performance data in said hired candidate's performance in the selected role after hiring;
identifying candidates with suitability rating for the selected role above a threshold value whose additional performance data indicates a poor performance after an initial ramp-up time; and outputting said actual performance data for the identified candidates to said ideal candidate profile generation component;
said ideal candidate profile generation component being configured to further update said ideal candidate profile based on said actual performance data and thereby provide an updated profile for the selected role having a set of weighting factors adjusted to avoid over-fitting of the updated profile to the one or more best performers.

9. The computer-implemented method as claimed in claim 8, further including the steps of inputting data associated with the candidate in performance of the selected role in the organization, and updating the ideal candidate profile based on said inputted performance data.

10. The computer-implemented method as claimed in claim 8, wherein said data associated with the candidate comprises one or more of data related to psychometric test results data and social networking data.

11. The computer-implemented method as claimed in claim 10, wherein said ideal candidate comprises an existing employee in the selected role in the organization, and said data associated with said ideal candidate comprises one or more of performance data associated with said existing data in the performance of the selected role, psychometric test results data associated with said existing employee and social network data associated with said existing employee.

12. The computer-implemented method as claimed in claim 8, wherein said step generating a profile comprises performing an analysis configured to generate said profile based on a sum of scores for each of a plurality of domains.

13. The computer-implemented method as claimed in claim 12, wherein said step of generating an ideal candidate profile comprises performing an analysis configured to generate said ideal candidate profile based on a sum of scores for each of a plurality of domains.

14. The computer-implemented method as claimed in claim 8, further including adjusting said weighting factors utilizing a genetic algorithm configured to randomly adjust at least one of said weighting factors by small amounts and executing a fitness function to generate at least one best fit weighting factor associated with said ideal candidate, the machine learning component identifying, from the performance data, the at least one top performer, each having values for the plurality of domains, and at least one low performer, each having values for the plurality of domains, and executing the genetic algorithm on a plurality of sets of weighing factors for the plurality of domains to generate the best fit weighting factor by selecting a set of weighting factors maximizing a fitness function, the fitness function for a given set of weighting factors comprising a difference between an average, across the at least one top performer, of weighted sums of the values for the plurality of domains using the given set of weighting factors and an average, across the at least one low performer, of weighted sums of the values for the plurality of domains using the given set of weighting factors.

15. A system for determining suitability of a candidate for a selected role in an organization, said system comprising:
a server, comprising a processor operatively coupled to a database and including an input component configured to retrieve performance data associated with an ideal candidate, wherein said ideal candidate comprises an existing employee in the selected role in the organization and said input component is configured to retrieve one or more of psychometric test results data associated with said existing employee and social network data associated with said existing employee;
said processor including a component configured to generate an ideal candidate profile based on said performance data associated with said ideal candidate, wherein said ideal candidate profile comprises a best fit profile of one or more top performers associated with the organization, and said processor includes a machine learning component configured to generate said best fit profile based on said performance data;
said processor including another input component configured to input data associated with the candidate, including one or more of psychometric test results data associated with the candidate and social network based data associated with the candidate;

said processor including a component configured to generate a profile for the candidate based on said inputted data;

said processor including a comparison component configured to compare said profile to said ideal candidate profile, and a component configured to generate a suitability rating for the selected role based on said comparison;

said processor further including a re-assessment feedback loop configured to generate additional performance data based on information from a candidate hired based on said suitability rating, said additional performance data comprising actual performance data in said hired candidate's performance in the selected role after hiring, and said re-assessment feedback loop being configured to identify candidates with suitability ratings for the selected role above a threshold value whose additional performance data indicates a poor performance after an initial ramp-up time, said actual performance data for the identified candidates being outputted to said ideal candidate profile generation component; and said ideal candidate profile generation component being configured to further update said ideal candidate profile based on said actual performance data from the identified candidates and thereby provide an updated profile for the selected role having a set of weighting factors adjusted to avoid over-fitting of the updated profile to the one or more best performers; and a plurality of client machines, each operatively coupled to the server and comprising a graphical user interface configured to execute one or more web pages comprising said input component, said ideal candidate component, said other input component, said profile component or said comparison component.

* * * * *